United States Patent
Carmen, Jr. et al.

(10) Patent No.: US 7,931,068 B2
(45) Date of Patent: Apr. 26, 2011

(54) MOTORIZED SHADE CONTROL SYSTEM

(75) Inventors: Lawrence R. Carmen, Jr., Bath, PA (US); Michael E. Lockley, Bethlehem, PA (US); Justin J. Mierta, Emmaus, PA (US); David J. Dolan, Bethlehem, PA (US); Stephen M. Ludwig, Jr., Bethlehem, PA (US); Thomas W. Brenner, Wescosville, PA (US)

(73) Assignee: Lutron Electronics Co, Inc., Coopersburg, PA (US)

(*) Notice: Subject to any disclaimer, the term of this patent is extended or adjusted under 35 U.S.C. 154(b) by 723 days.

(21) Appl. No.: 11/238,529

(22) Filed: Sep. 28, 2005

(65) Prior Publication Data
US 2006/0021714 A1    Feb. 2, 2006

Related U.S. Application Data

(63) Continuation of application No. 10/660,061, filed on Sep. 11, 2003, now Pat. No. 6,983,783.

(60) Provisional application No. 60/477,626, filed on Jun. 10, 2003.

(51) Int. Cl.
    *A47H 1/00*    (2006.01)
(52) U.S. Cl. ........ 160/120; 318/264; 318/265; 318/266; 318/267
(58) Field of Classification Search .......... 318/264–267, 318/286, 466–469; 160/120, 241, 310, 1, 160/311, 7, 188, 121.1, 168.1 D, 176.1 D; 316/264–267, 286, 466–469
See application file for complete search history.

(56) References Cited

U.S. PATENT DOCUMENTS

| | | | | |
|---|---|---|---|---|
| 4,618,804 A | | 10/1986 | Iwasaki | 318/16 |
| 4,665,965 A | * | 5/1987 | Pasquier et al. | 160/310 |
| 4,712,104 A | * | 12/1987 | Kobayashi | 340/825.52 |
| 4,836,264 A | * | 6/1989 | Machin | 160/120 |
| 4,856,574 A | * | 8/1989 | Minami et al. | 160/168.1 R |
| 4,881,219 A | | 11/1989 | Jacquel | 700/90 |
| 5,225,748 A | * | 7/1993 | Haring | 318/266 |
| 5,383,510 A | * | 1/1995 | Allen | 160/310 |
| 5,454,077 A | * | 9/1995 | Cheron | 710/106 |
| 5,467,266 A | * | 11/1995 | Jacobs et al. | 700/56 |
| 5,532,560 A | * | 7/1996 | Element et al. | 318/266 |
| 5,540,269 A | * | 7/1996 | Plumer | 160/3 |
| 5,671,387 A | | 9/1997 | Jacobs et al. | 395/420 |

(Continued)

FOREIGN PATENT DOCUMENTS

DE    4008940    9/1991

(Continued)

*Primary Examiner* — Katherine Mitchell
*Assistant Examiner* — Candace L Bradford
(74) *Attorney, Agent, or Firm* — Drinker Biddle & Reath LLP

(57) ABSTRACT

A motorized shade control system includes electronic drive units (EDUs) having programmable control units directing a motor to move an associated shade in response to command signals directed to the control units from wall-mounted keypad controllers or from alternate devices or control systems connected to a contact closure interface (CCI). Each of the EDUs, keypad controllers and CCIs of the system is connected to a common communication bus. The system provides for initiation of soft addressing of the system components from any keypad controller, CCI or EDU. The system also provides for setting of EDU limit positions and assignment of EDUs to keypad controllers from the keypad controllers or CCIs. The system may also include infrared receivers for receiving infrared command signals from an infrared transmitter.

49 Claims, 14 Drawing Sheets

U.S. PATENT DOCUMENTS

| | | | |
|---|---|---|---|
| 5,729,103 A | 3/1998 | Domel et al. | 318/283 |
| 5,969,492 A | 10/1999 | Motte et al. | 318/266 |
| 6,069,465 A * | 5/2000 | de Boois et al. | 318/675 |
| 6,119,759 A * | 9/2000 | Assaad | 160/310 |
| 6,201,364 B1 * | 3/2001 | Will et al. | 318/466 |
| 6,298,273 B1 | 10/2001 | Grehant et al. | 700/108 |
| 6,339,798 B1 * | 1/2002 | Cheron et al. | 710/9 |
| 6,465,980 B1 | 10/2002 | Orsat | 318/466 |
| 6,497,267 B1 | 12/2002 | Azar et al. | 160/310 |
| 6,581,664 B2 * | 6/2003 | Kroner et al. | 160/70 |
| 6,598,648 B1 * | 7/2003 | Schulte | 160/1 |
| 6,598,652 B1 | 7/2003 | Montesinos | 160/331 |
| 6,867,565 B2 | 3/2005 | Maistre et al. | 318/468 |
| 6,936,987 B2 | 8/2005 | Cheron | 318/468 |
| 6,983,783 B2 * | 1/2006 | Carmen et al. | 160/120 |
| 7,030,578 B2 * | 4/2006 | Orsat | 318/16 |
| 7,138,912 B2 * | 11/2006 | Fitzgibbon et al. | 340/521 |
| 7,152,652 B2 * | 12/2006 | Heitel | 160/5 |
| 7,240,716 B2 * | 7/2007 | Nichols et al. | 160/310 |
| 7,389,806 B2 * | 6/2008 | Kates | 160/5 |
| 2003/0015302 A1 * | 1/2003 | Pessina et al. | 160/331 |
| 2003/0098133 A1 * | 5/2003 | Palmer | 160/310 |
| 2004/0250964 A1 * | 12/2004 | Carmen et al. | 160/120 |
| 2005/0034374 A1 * | 2/2005 | Ebbe et al. | 49/325 |
| 2005/0087313 A1 * | 4/2005 | Nichols et al. | 160/310 |
| 2005/0131554 A1 * | 6/2005 | Bamberger et al. | 700/19 |
| 2006/0137833 A1 * | 6/2006 | Nichols et al. | 160/120 |
| 2006/0184853 A1 * | 8/2006 | Devis et al. | 714/749 |
| 2007/0211447 A1 * | 9/2007 | Veskovic | 362/1 |
| 2007/0272374 A1 * | 11/2007 | Moseley et al. | 160/310 |
| 2008/0114811 A1 * | 5/2008 | Murdoch | 707/104.1 |
| 2009/0005911 A1 * | 1/2009 | Decroix et al. | 700/275 |

FOREIGN PATENT DOCUMENTS

| | | |
|---|---|---|
| DE | 9114598 | 6/1993 |
| WO | WO 03042480 A2 * | 5/2003 |

* cited by examiner

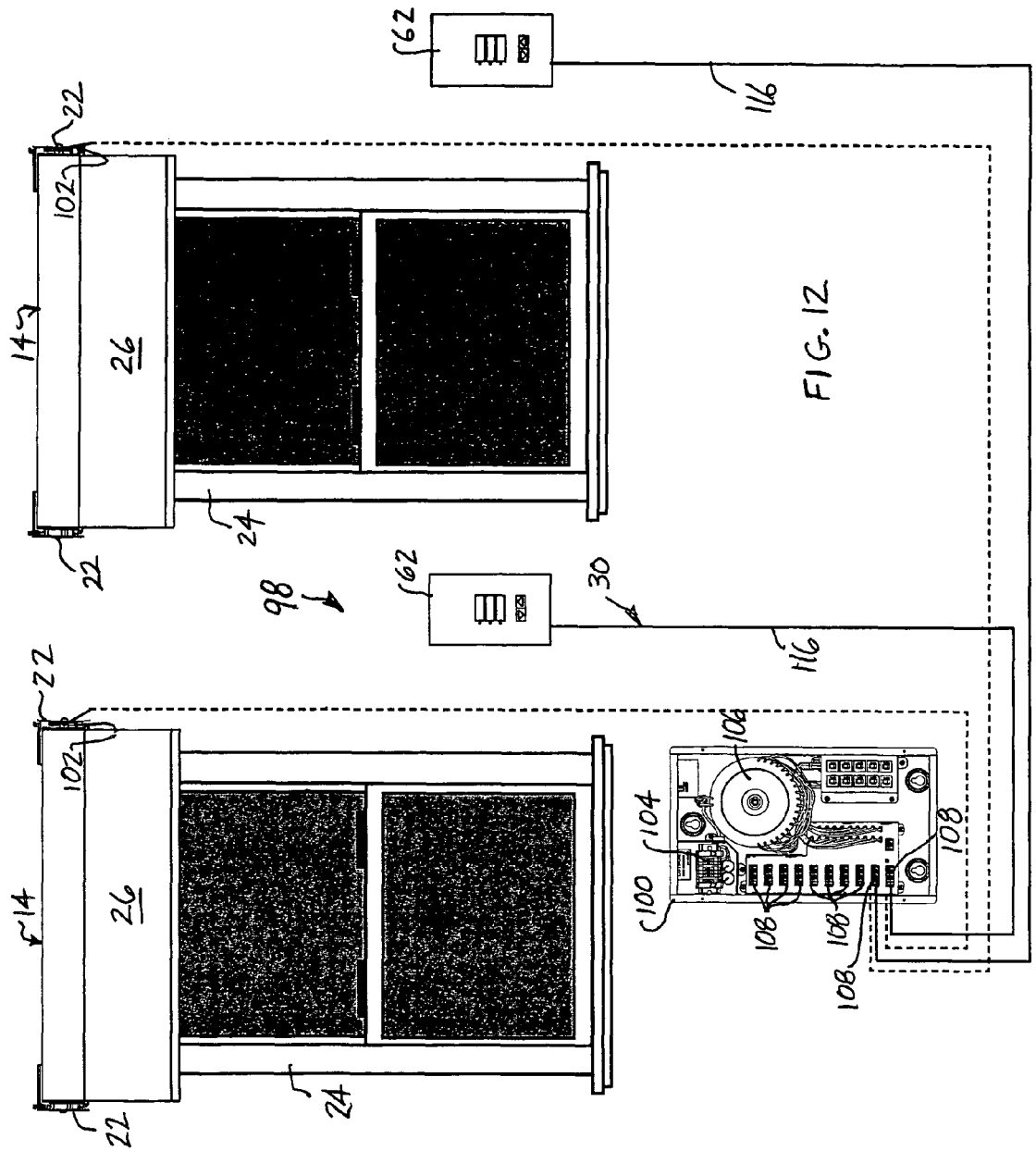

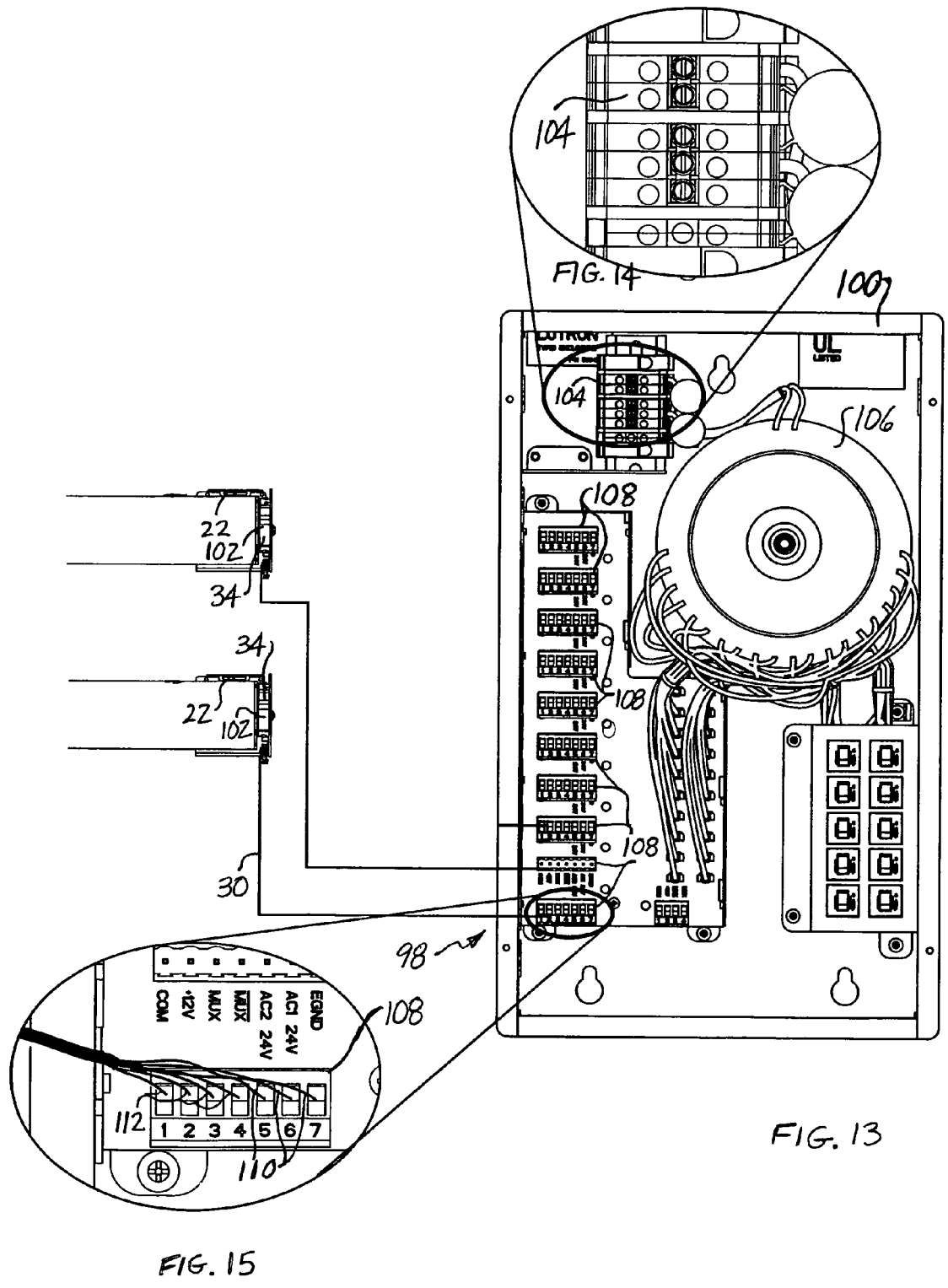

MOTORIZED SHADE CONTROL SYSTEM

CROSS-REFERENCE TO RELATED APPLICATIONS

The present application is a continuation of U.S. application Ser. No. 10/660,061, filed Sep. 11, 2003, now U.S. Pat. No. 6,983,783 which claims priority from U.S. provisional application Ser. No. 60/477,626, filed Jun. 10, 2003.

FIELD OF THE INVENTION

The present invention relates to motorized shades and more particularly to a system for controlling motorized shades.

BACKGROUND OF THE INVENTION

It is known to control the operation of a motorized shade by transmitting command signals to the motorized shade from a location remote from the shade, directing the motor to move the shade. Known control systems include wall-mountable keypads linked to motorized shades by wire communication lines. It is also known to transmit shade control signals from one location to another using wireless communication links such as radio-frequency or infrared transmission.

Shade control systems are known that have multiple keypads and multiple motorized shades interconnected by a communications network for transmitting control signals between keypads and motorized shades included in the system. Known forms of shade control communication networks include hub systems in which a central group controller is connected to multiple motorized shades and to multiple keypads for directing signals from the keypads to the shades. Known forms of shade control communication networks also include segmented constructions in which sub-networks of keypads communicating with motorized shades are, in turn, interconnected by a communications link.

SUMMARY OF THE INVENTION

According to one aspect of the present invention, a shade control system includes a plurality of drive units each having a motor adapted for moving an associated shade member and a plurality of drive unit controllers each capable of generating command signals for directing at least one of the drive units to move the associated shade member. The shade control system also includes a communication bus to which each of the drive units and drive unit controllers is connected in a common arrangement such that each one of the drive units and drive unit controllers can communicate with every other drive unit and drive unit controllers.

According to one embodiment, the shade member associated with each drive member is a shade fabric wound onto a roller tube. The drive unit controllers preferably include at least one keypad controller having an open limit actuator and a close limit actuator for generating command signals for moving the associated shade fabric of at least one of the drive units to an open limit position and a close limit position. The keypad controller also preferably includes a raise actuator and a lower actuator for generating command signals for moving the associated shade fabric of at least one of the drive units through raise and lower position adjustments.

The system may also include an infrared transmitter for transmitting infrared command signals to a keypad controller having an internal infrared receiver or to an external infrared receiver adjacent one of the drive units. The system may also include a contact closure interface having inputs for connection of an alternate device or control system to the contact closure interface for generating command signals for controlling one or more of the drive units.

According to one embodiment, each of the keypad controllers includes a programmable microprocessor for programming the shade control system in response to actuation of the keypad actuators in a predetermined combination or sequence. The microprocessor is preferably programmed to provide for (i) automatic addressing of all system components, (ii) limit setting for the drive units and (iii) assigning drive units to keypad controllers. The system may also include contact closure interfaces or drive units including microprocessors capable of programming the shade control system.

BRIEF DESCRIPTION OF THE DRAWINGS

FIG. 12 is a view, schematic in part, of a motorized shade control system according to the present invention having power transmission panels;

FIG. 13 is a view, schematic in part, of wiring connections between the power transmission panel and electronic drive units of FIG. 12;

FIG. 14 is an enlarged detail view of a portion of the power transmission panel of FIG. 13;

FIG. 15 is an enlarged detail view of a portion of the power transmission panel of FIG. 13;

DESCRIPTION OF THE INVENTION

Figure 1:
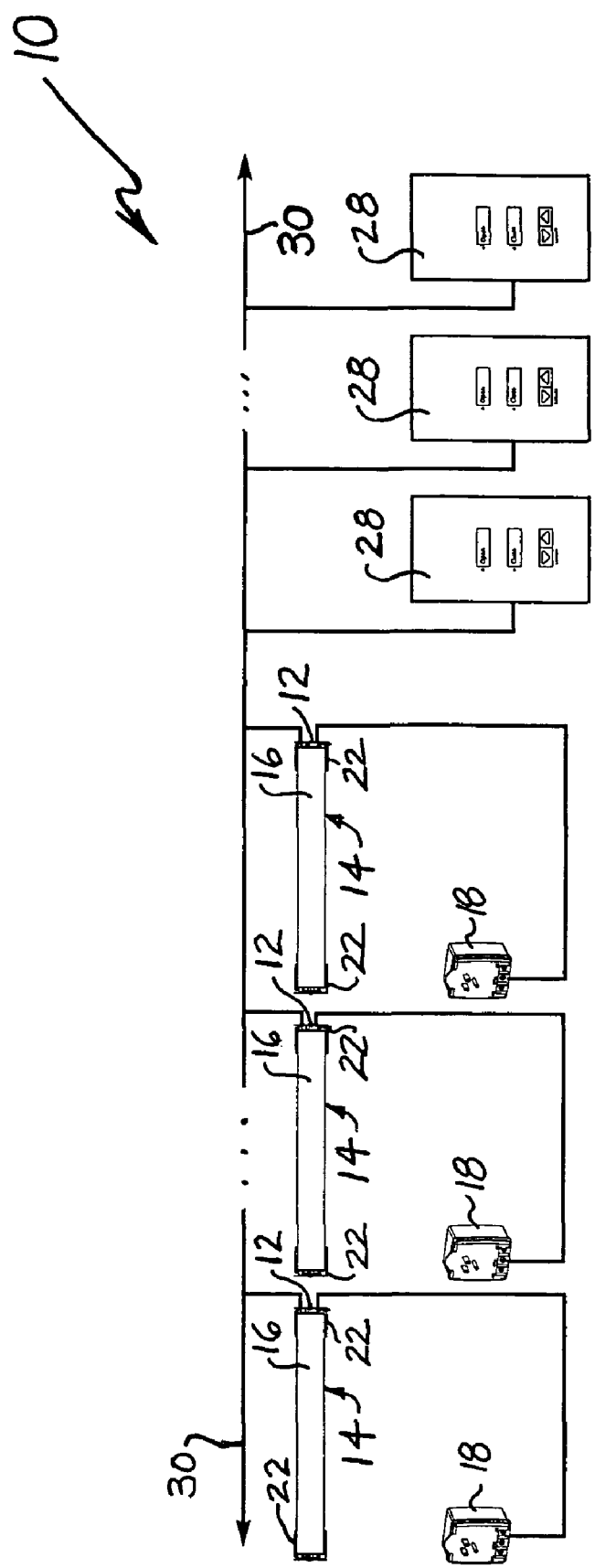
FIG. 1 is a schematic view of a motorized shade control system according to the present invention.

Referring to the drawings, where like numerals identify like elements, there is shown a motorized shade control system 10 according to the present invention. As will be described in greater detail, the shade control system of the present invention uses a communication network that provides for communication between each component of the system and every other component of the system. This arrangement facilitates system programming, including facilitating soft addressing of all system components from multiple locations.

I. The Shade Control System

Figure 2:
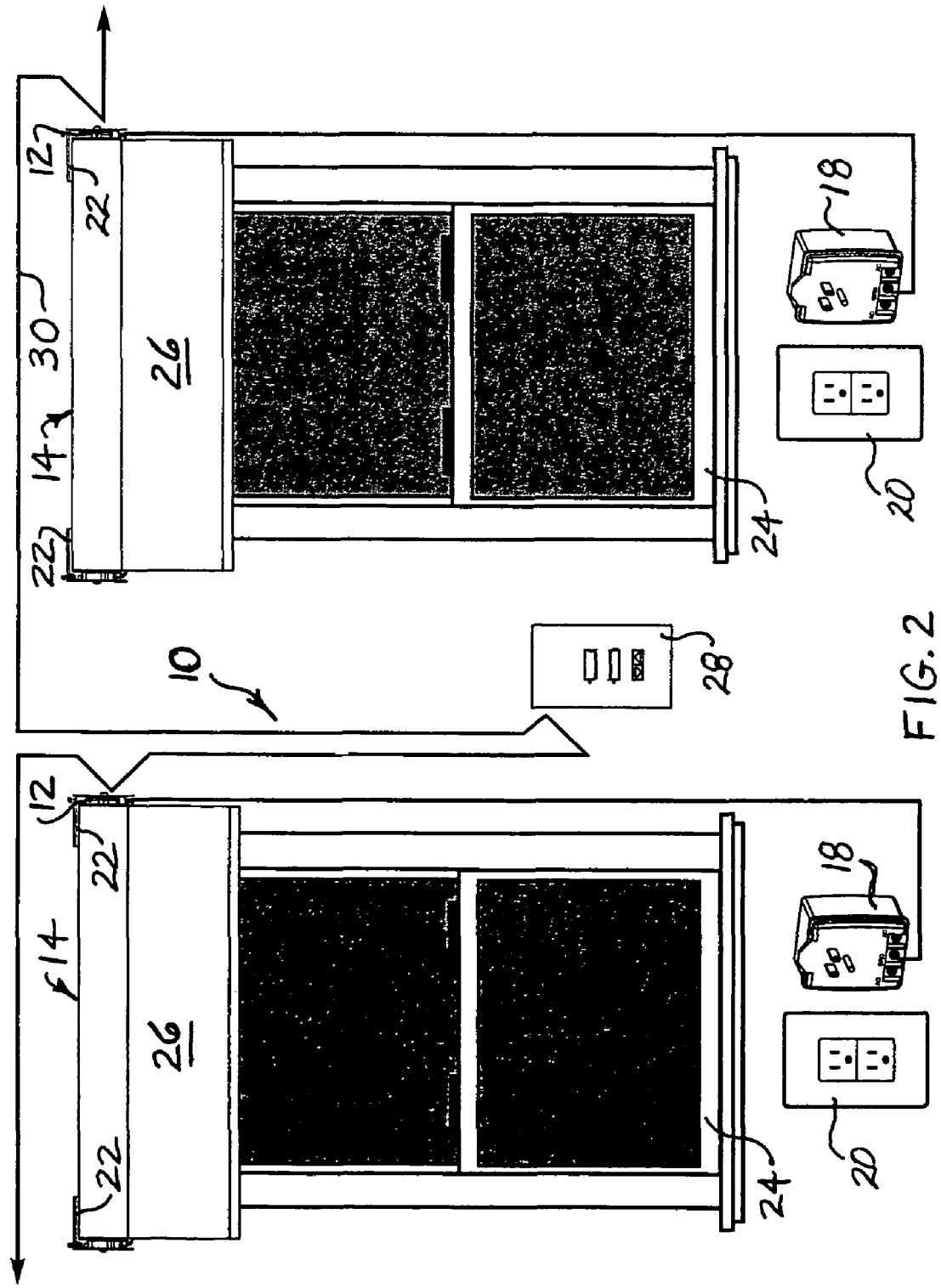
FIG. 2 is a view, schematic in part, of a portion of a motorized shade control system according to the present invention.

Referring to FIGS. 1 and 2, the control system 10 includes a plurality of electronic drive units 12 each rotatingly driving a roller tube 16 of a motorized shade 14. Each of the drive units 12 is connected to a transformer 18 to receive power at the voltage required by the drive unit 12. The transformers 18 are plug-in transformers connectable to a source of power, such as a wallbox receptacle 20 as shown in FIG. 2, for example. Each motorized shade 14 being controlled by the shade control system 10 includes brackets 22 at opposite ends of the roller tube 16. As shown in FIG. 2, the brackets 22 rotatably secure the motorized shade 14 adjacent a window or other structure 24, for example to shade the window by a shade fabric 26 wound onto the roller tube 16.

The motorized shade control system 10 of FIGS. 1 and 2 also includes keypad controllers 28 for controlling the operation of the electronic drive units 12. The keypad controllers 28 are preferably mounted in a readily accessible location remote from the drive units 12, such as in a wallbox installation in a manner similar to wall-mounted controls for lights and ceiling fans. Each of the keypad controllers 28 is capable of controlling one or more of the drive units 12 of the system 10. The number of drive units 12 controlled by each of the keypad controllers 28 will depend on the assignment of the drive units 12 to the keypad controllers 28 that has been programmed into the system 10 in the manner described below.

The motorized shade control system 10 includes a communication network providing for transmission of control signals between the keypad controllers 28 and the electronic drive units 12. As shown schematically in FIGS. 1 and 2, all of the keypad controllers 28 and drive units 12 of the control system 10 are connected to one common communication bus line 30. The use of a common communication bus line 30 provides for programming of the control system 10 from any of the keypad controllers 28. This arrangement facilitates modification of the system programming, which may be necessary for changing the assignment of the electronic drive units 12, for example, or for removal and replacement of system components.

Figure 3:
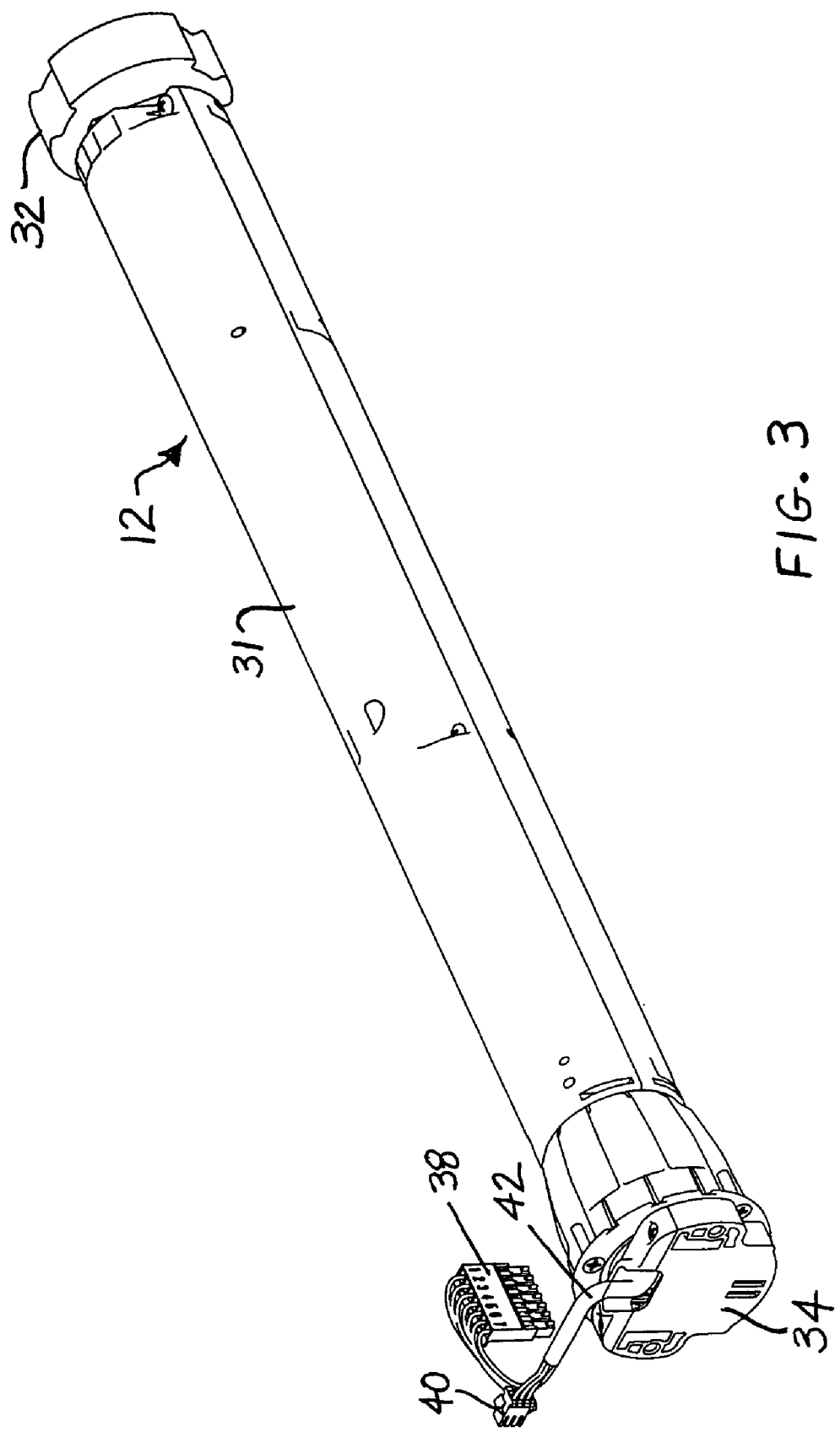
FIG. 3 is a perspective view of an electronic drive unit (EDU) of the shade control system of FIG. 1.
Figure 4:
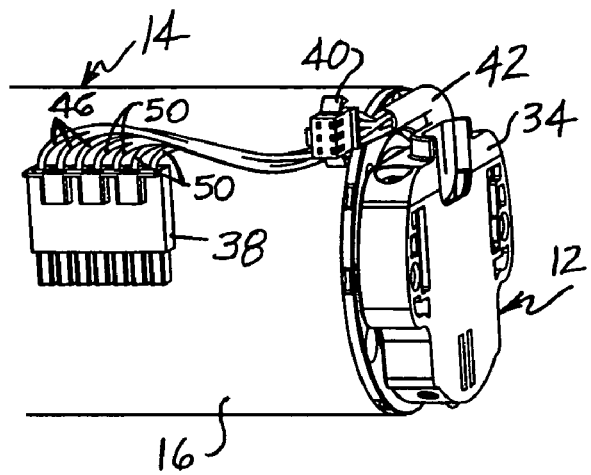
FIG. 4 is a perspective view of the electronic drive unit of FIG. 3 received within a roller tube of a motorized shade.

Referring to FIGS. 3 and 4, the electronic drive units 12 of control system 10 are shown in greater detail. Each of the drive units 12 includes an elongated motor 31 rotatingly driving a bearing 32. The bearing 32 is notched about its outer periphery to facilitate engagement between the bearing 32 and an interior of the roller tube 16 in which the motor 31 is received. Each of the electronic drive units 12 further includes a control unit 34 attached to the motor 31 opposite the bearing 32 such that the control unit 34 is positioned adjacent an end 36 of the roller tube 16.

The control unit 34 of the electronic drive unit 12 includes a microprocessor capable of monitoring the operation of the motor 31 to track the position of the associated shade fabric 26 as it is raised and lowered with respect to the roller tube 16. The control unit 34 also controls the motor 31 to adjust the position of the shade fabric 26 in accordance with preset shade positions programmed into the control system 10. As will be described below, the control unit microprocessors are programmable to provide for system programming at each of the electronic drive units 12 as well as at each of the keypad controllers 28.

Each of the electronic drive units 12 further includes a male connector 38 to which are connected conductors to provide wiring connection for power and communications transmissions for the drive unit 12. The drive unit 12 further includes an accessory connector 40 for connection of an infrared receiver, as described below for example, to the electronic drive unit 12. The male connector 38 and accessory connector 40 are attached to the control unit 34 of the drive unit 12 by a wire harness 42.

Figure 5:
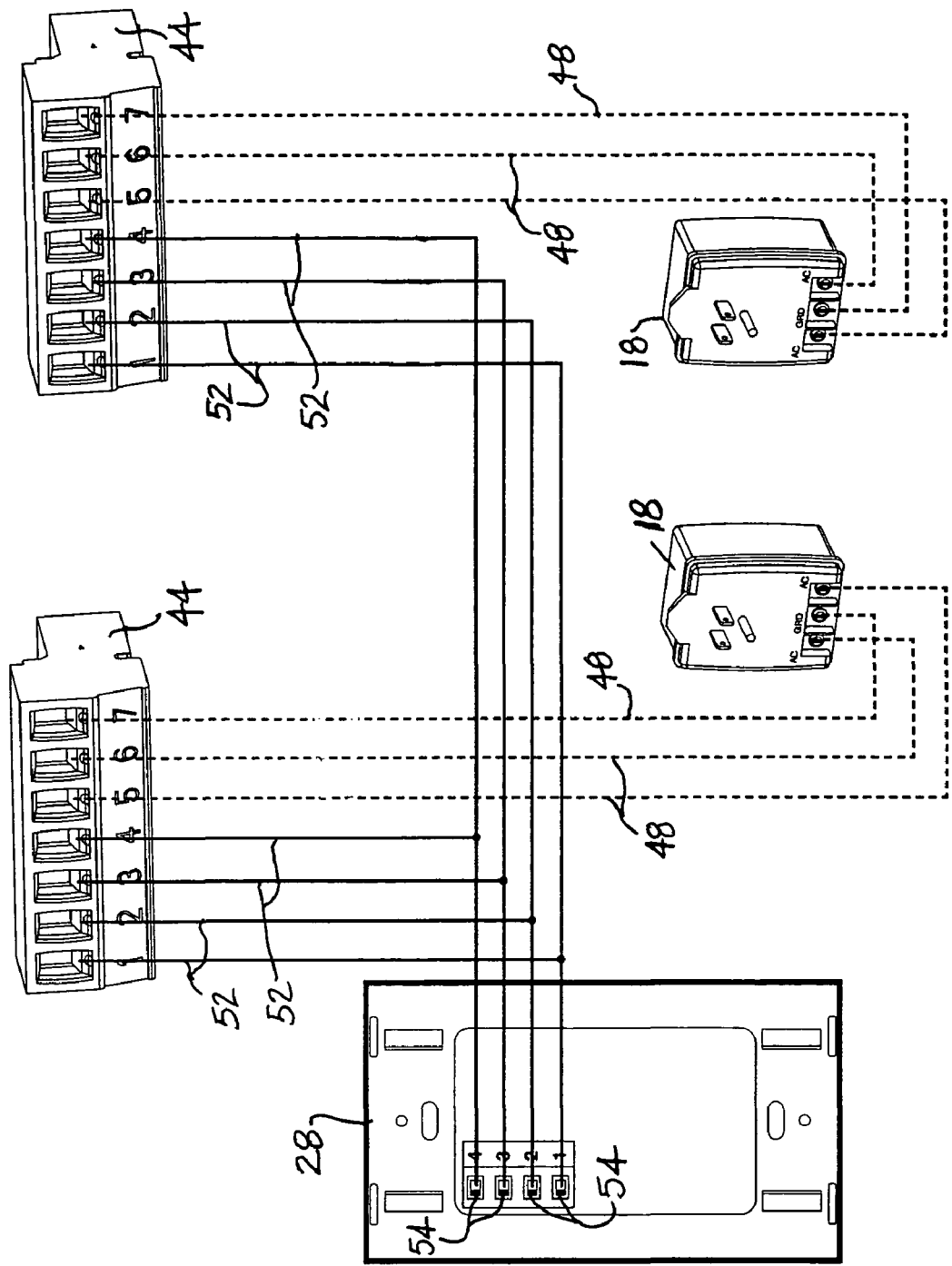
FIG. 5 is a view, schematic in part, of the wiring connections for the shade control system of FIG. 2.

Referring to FIG. 5, the wiring connections between the keypad controller 28 of FIG. 2 and the electronic drive units 12, and between the drive units 12 and the plug-in transformers 18, are shown in further detail. The shade control system 10 includes female connectors 44 engageable with the male connectors 38. The engagement between the male and female connectors 38, 44 links three conductors 46 from the wire harness 42 of the drive units 12 to three conductors 48 attached to transformers 18. That connection between the conductors 46, 48 through the male and female connectors 38, 44 provides for power transfer from the transformers 18 to the electronic drive units 12. The male and female connectors 38, 44 also link four conductors 50 from the wire harnesses 42 of the electronic drive units 12 to conductors 52, to transmit signals between the electronic drive units 12 and the keypad controller 28 and to power the keypad controller. As shown in FIG. 5, the conductors 52 are connected to those of the other drive unit 12 connected to terminal connectors 54 of the keypad controller 28.

Figure 6:
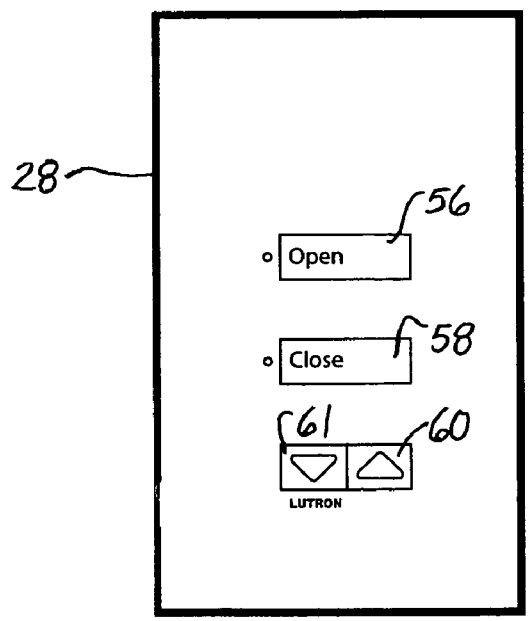
FIG. 6 is a front elevation view of the keypad controller of FIG. 2.

Referring to FIG. 6, the keypad controller 28 of the motorized shade control system 10 of FIG. 2 is shown in greater detail. The keypad controller 28 includes "open" and "close" buttons 56, 58, for respectively directing the electronic drive units 12 assigned to that keypad controller 28 to drive the associated shade fabrics 26 to full open and full close limit positions. The keypad controller 28 further includes raise/lower buttons 60, 61 (or other raise/lower actuator) for fine-tuning adjustment of the shade position.

The keypad controllers 28 of the control system 10 receive power from the electronic drive units 12. This arrangement, however, is not required. It is conceivable, for example, that the keypad controllers 28 could be connected to a power source separate from that powering the electronic drive units 12, and could be battery-powered, for example.

Figure 8:
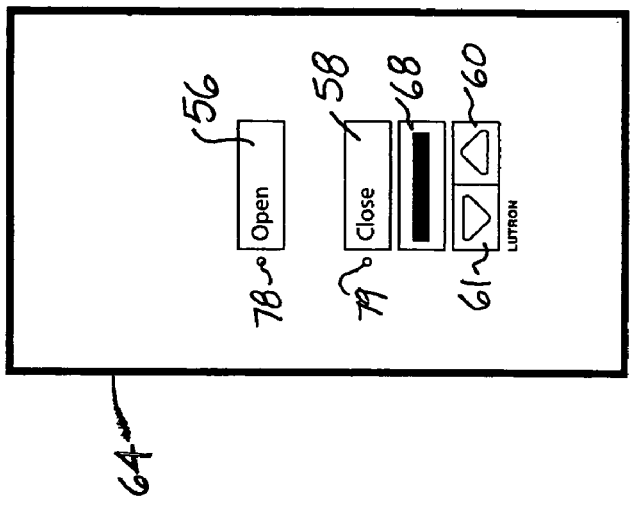
FIG. 8 is a front elevation view of a second alternative keypad controller.
Figure 7:
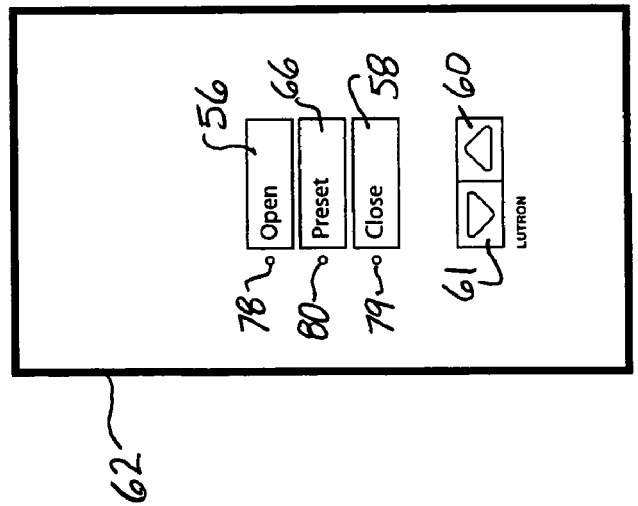
FIG. 7 is a front elevation view of an alternative keypad controller for use with a control system according to the present invention.

Referring to FIGS. 7 and 8, there are shown alternate keypad controllers 62, 64 for use in the shade control system 10 of the present invention. Keypad controller 62 of FIG. 7, in a fashion similar to keypad controller 28 of FIG. 6, includes open and close buttons 56, 58 and raise/lower buttons 60, 61. The keypad controller 62, however, further includes a preset button 66 for directing the assigned drive units 12 to raise or lower the associated shade fabrics 26 to a position that has been pre-programmed into the microprocessor of the keypad controller 62. A keypad controller according to the present invention could alternatively include multiple preset buttons.

The present invention is not limited, however, to any particular arrangement of actuators. For example, it is not a requirement of the present invention that the keypad controllers include open, close and raise/lower adjustment actuators. It is also conceivable that the keypad controller could include actuators for directing one or more of the drive units to perform other control functions from those described above. It is also conceivable that the keypad controller could be a "dual" keypad having first and second sets of actuators with each set of actuators controlling the operation of one or more of the drive units of the control system.

Figure 9:
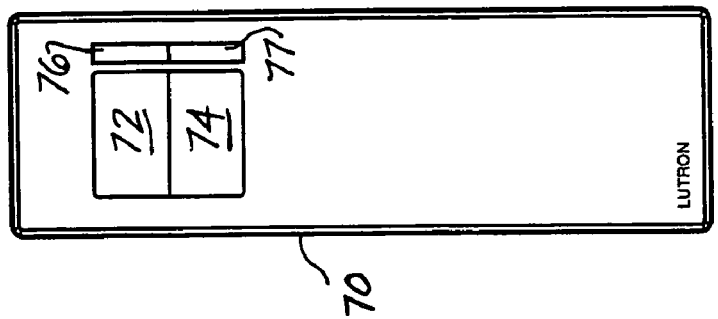
FIG. 9 is a front elevation view of an infrared transmitter for use with a control system according to the present invention.

Keypad controller 64 of FIG. 8, similar to keypad controller 28 of FIG. 6, includes open and close buttons 56, 58, and raise/lower buttons 60, 61. Keypad controller 64 further includes an IR window 68 for transmission of infrared control signals to an IR receiver located within the keypad controller 64 from an IR transmitter, such as transmitter 70 shown in FIG. 9. The IR transmitter 70 includes full open and full close buttons 72, 74 and raise/lower buttons 76, 77 for generating corresponding IR command signals to the internal IR receiver of keypad controller 64. The keypad controller 64 functions in response to the infrared signals received from the IR transmitter 70 in the same fashion as if a user were actuating the buttons 56, 58 and actuator 60 of the keypad controller. It should be noted, however, it is not necessary that actuation of the IR transmitter actuators direct one or more of the drive units in exactly the same manner as the keypad actuators. It is conceivable, for example, that the transmitter 70 could include a microprocessor programmed to direct one or more of the drive units to move the associated shade to different positions than would result from similar actuation using the keypad actuators.

Each of the keypad controllers 28, 62, 64 of FIGS. 6-8 includes LED indicators 78, 79 respectively located beside the open and close buttons 56, 58. Keypad controller 62 also includes an LED indicator 80 located beside the preset selector button 66. The LED indicators 78, 79, 80 provide visual indications during various steps in the programming of the control system 10 in the manner described below. The keypad controllers could also include LED arrays for running multiple LED logic. For example, a linear array of LEDs could be included in a keypad controller to provide a visual indication of shade position.

Each of the keypad controllers 28, 62, 64 of FIGS. 6-8 is described above as including an arrangement of buttons dedicated to performing particular functions upon actuation (e.g., an "open" button 56 and a "close" button 58). It should be understood, however, that the keypad controllers are not limited to the particular arrangement shown, or to any one set arrangement. It is conceivable, for example, that the keypad controllers could be button-by-button programmed, or re-programmed, to a different arrangement of assigned functions from that shown (e.g., re-programming buttons 56 and 58 to be "close" and "open" buttons, respectively).

Figure 10:
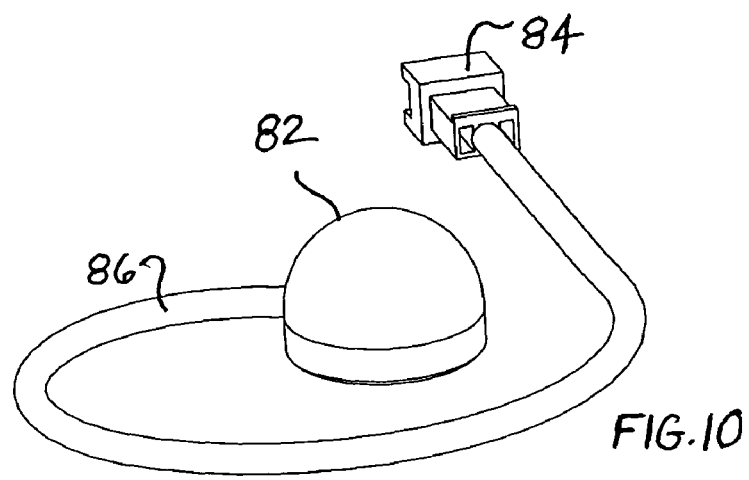
FIG. 10 is a perspective view of an infrared receiver for use with the electronic drive unit of FIGS. 3 and 4.

Referring to FIG. 10, the control system 10 may also include an external infrared receiver 82 having a connector 84 secured to a cable 86. The connector 84 is adapted for connection to the accessory connector 40 of the control unit 34 of an electronic drive unit 12 to provide for transmission of infrared command or programming signals from an infrared transmitter, such as transmitter 70 to the microprocessor of the control unit 34.

Figure 11:
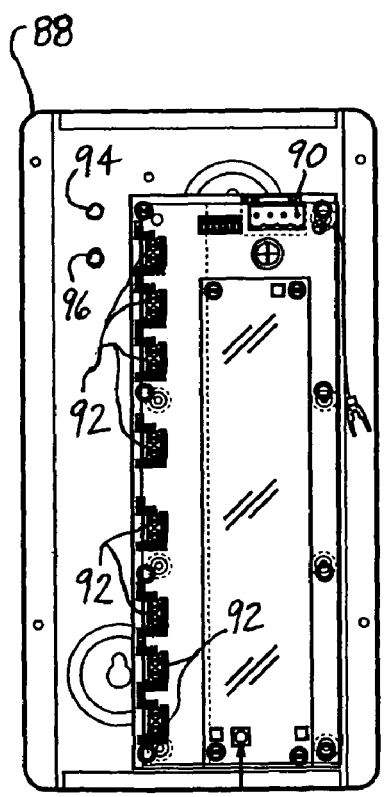
FIG. 11 is a front elevation view of a contact closure interface for use with a control system according to the present invention.

The control system 10 may also include a contact closure interface (CCI) 88, shown in FIG. 11. The CCI 88 includes terminal connectors 90 for connecting four conductors from the main communication bus 30 for transfer of programming or control signals between the CCI 88 and the communication bus 30 and for powering the CCI. The CCI 88 includes eight contact closure inputs 92 for connecting the CCI to an alternate control device, such as a touchscreen, or to an alternate control system, such as a lighting control system for example. The connections provided by the inputs 92 of the CCI 88 provide for integration of alternate devices and control systems with the control system 10 of the present invention. The CCI 88 functions in a fashion similar to a keypad controller of the control system 10 to provide for programming of the control system 10 or for controlling electronic drive units 12 assigned to the CCI 88. In a fashion similar to the "open" and "close" LED indicators 78, 79 of keypad controller 28, the CCI 88 includes LED indicators 94, 96 to provide visual indications to a user of the CCI-connected device or system during programming of the control system 10. Also in a similar fashion to the keypad controllers, it is conceivable that the CCIs could run multiple LED logic such as a linear array indicating position of associated shade fabrics being controlled by a CCI-connected device. It is also conceivable that the CCI inputs could be configured into multiple sets of inputs each operating a different grouping of drive units compared to the other set of inputs.

In the control system 10 shown in FIGS. 1 and 2, each of the electronic drive units 12 is connected to its own transformer 18 for receiving power at the appropriate voltage required by the drive unit 12. Turning to FIGS. 12-16, there is shown a motorized shade control system 98 including a power transmission panel 100 capable of distributing power to multiple electronic drive units 102. The power transmission panel 100, as shown in FIG. 13 and in the enlarged detail view of FIG. 14, includes terminals 104 for connecting the panel 100 to a source of power, such as AC line voltage. The power transmission panel 100 also includes a distributor 106 that links the line-voltage terminals 104 with multiple terminal blocks 108 to direct power at a reduced voltage appropriate for the electronic drive units 102 to the terminal blocks 108.

As shown in the enlarged detail view of FIG. 15, each of the terminal blocks 108 of the power transmission panel 100 is adapted for connection to seven conductors extending between the power transmission panel and one of the electronic drive units 102. The seven conductors include three conductors 110 that, in a manner similar to the conductors 46 of the electronic drive units 12, provide for power transfer from the terminal block 108 of the power transmission panel 100 to the electronic drive unit 102. The seven conductors also include four conductors 112 that, in a manner similar to the conductors 50 of the electronic drive units 12, provide for transfer of control and programming signals between the power transmission panel 100 and one of the electronic drive units 102.

As shown schematically in FIG. 12, the shade control system 98 includes keypad controllers 62 for controlling the electronic drive units 102 and for transmitting system programming signals. Each of the keypad controllers 62 is linked to the power transmission panel 100 by a four-conductor cable 116. As shown in FIG. 12, the conductors of cable 116 are attached to one of the terminal blocks 108 of the power transmission panel 100 such that the conductors of cable 116 are conductively connected to the four communication conductors 112 of one of the electronic drive units 102. The conductive connection between the conductors of cable 116 and the conductors 112 provides for transfer of command signals between the keypad controller 62 and the shade control system 98. The connection of the four-conductor cable 116 to the conductors 112 also powers the keypad controller 62.

Figure 16:
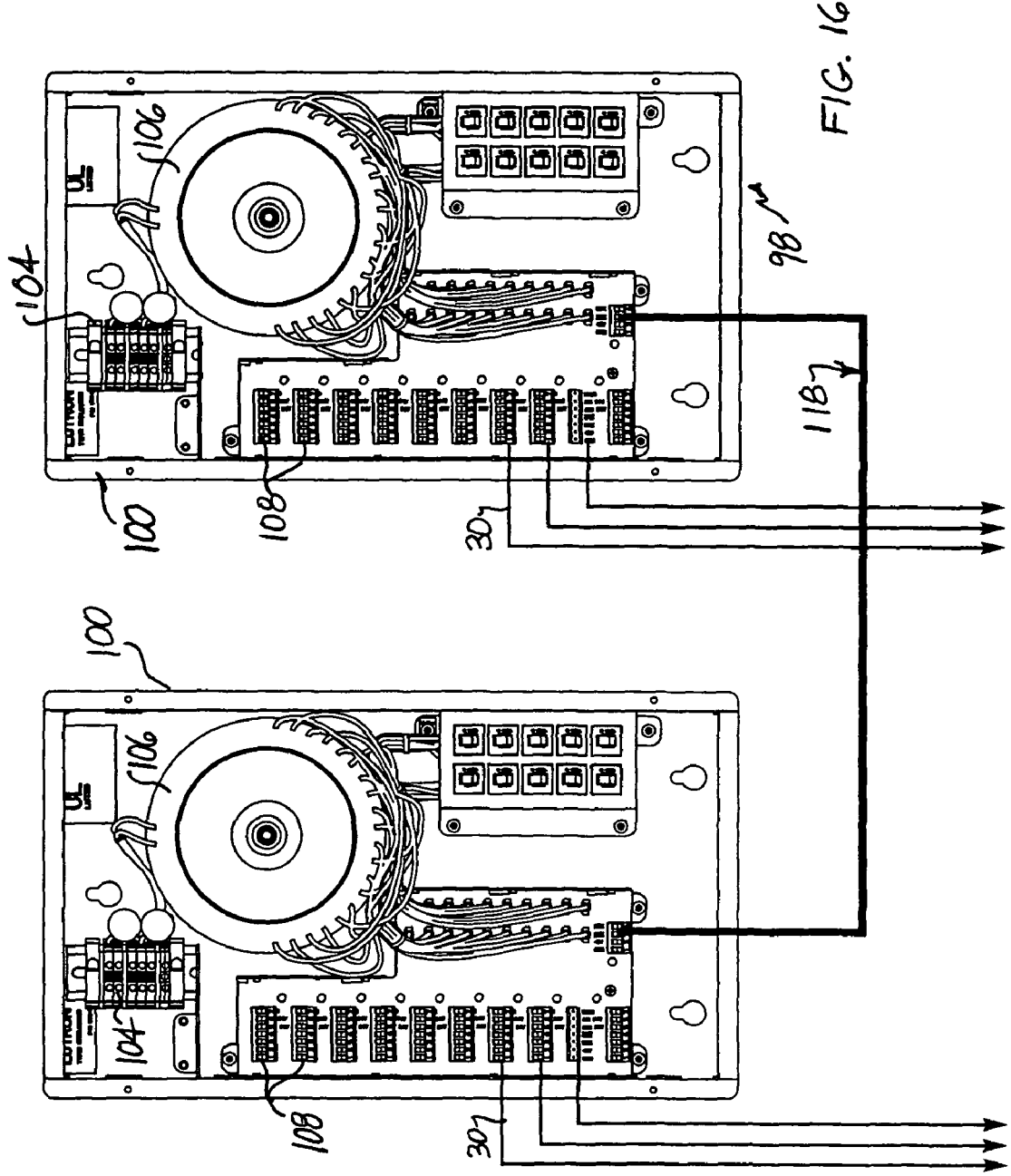
FIG. 16 is a view, schematic in part, of first and second power transmission panels linked by a communication cable.

Referring to FIG. 16, the shade control system 98 may include multiple power transmission panels 100 each capable of distributing power from a line-voltage source to ten electronic drive units 102. To provide a bus line communications bridge between the multiple power transmission panels 100, the shade control system 98 includes four-conductor communications cables 118, each linking two of the power transmission panels together.

Figure 17:
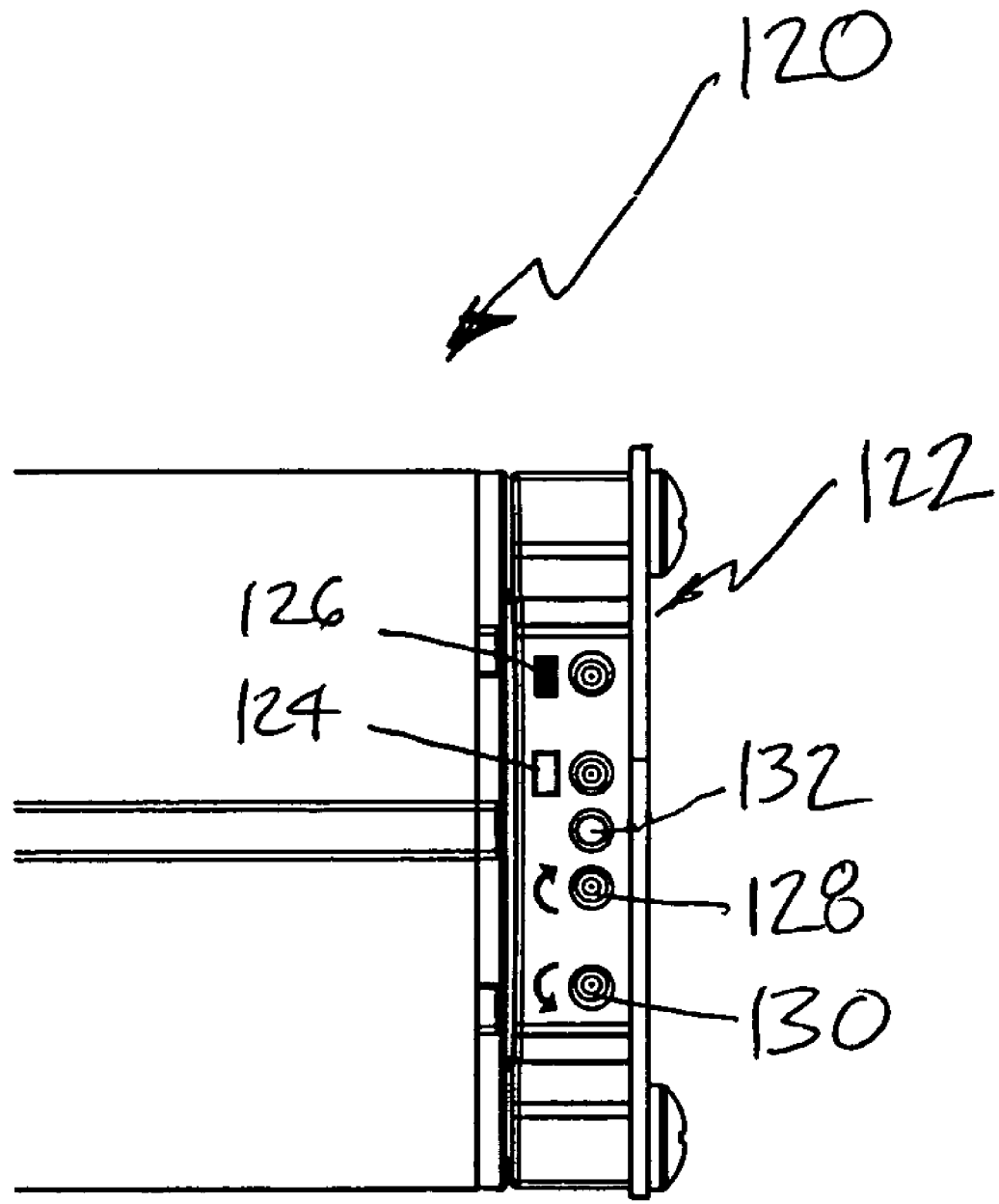
FIG. 17 is an elevation view of an electronic drive unit according to the present invention having a shade control panel for shade adjustment or system programming at the drive unit.

In the shade control system 10 shown in FIGS. 1 and 2, programming of the system could be achieved through the programmable microprocessor of any of the keypad controllers, contact closure interfaces or infrared receivers of the system. System programming could also be achieved through any of the drive units. As described above in regard to FIGS. 3 and 4, the electronic drive units 12 may include programmable microprocessors to provide for system programming via the electronic drive units 12 in addition to via the keypad controllers 28 or contact closure interfaces 88. Referring now to FIG. 17, there is shown an electronic drive unit 120 according to the present invention having a control panel 122 providing a user interface to the programmable microprocessor to program the system through the electronic drive unit 120.

The control panel 122 of electronic drive unit 120 includes an open limit button 124 and a close limit button 126. Buttons 124, 126 respectively provide for setting of the position the fabric shade of the associated motorized shade will occupy when a user actuates the full open and full close buttons 44, 46 of an associated keypad controller 28. The control panel 122 also includes first and second adjustment buttons 128, 130 for respectively directing the motor of the electronic drive unit 120 to rotate the roller tube 16 in opposite directions to set the desired full open and full close positions for the associated fabric shade. The control panel 122 also includes an LED indicator 132 providing visual indication to a user during programming of the shade control system.

II. Configuration Using the System Network

The preferred manner in which the above-described constructions are used to program the shade control system of the present invention will now be discussed in greater detail. In general, the programming of the motorized shade control system of the present invention will include addressing of each component of the system. The programming of the control system will also include setting open and close limits for each of the electronic drive units (EDUs) and assigning EDUs to each of the keypad controllers, contact closure interfaces, or IR receivers included in the shade control system.

A. Addressing of System Components

For proper operation of the above-described shade control system of the present invention, each component included in the system must be given a unique address identifier to distinguish the components of the system from each other. As described above, the shade control system of the present invention utilizes a communication network in which all of the system components are connected to a common communications bus. The use of a common bus network provides for "soft addressing" of the system components in which a unique address can be automatically assigned to each component when a user enters a "system configuration mode." As will be described below, the system configuration mode is used to address components and to assign electronic drive units to keypad controllers, contact closure interfaces (CCI) or infrared receivers. The system configuration mode could also be activated from any one of the keypad controllers or IR transmitters, or from an alternate device or control system linked to the shade control system through a CCI.

The present invention provides for automatic addressing of system components, which results in each of the components having a unique address identifier associated with it. It should be understood, however, that the identifiers need not be assigned by the system according to any particular series or pattern and could, for example, be accomplished by random numbering. It is only required that the address identifiers be unique such that the system can distinguish one component of the system from another.

The shade control system of the present invention provides for addressing of system components from any one of the keypad controllers 28, 62, 64 as follows. A selected one of the keypad controllers 28, 62, 64 is placed in "system configuration mode" by pressing and holding both the "open" and "close" buttons 56, 58. It is preferable that more than a tapping engagement of the buttons is necessary, such as a sustained hold for several seconds for example, to prevent inadvertent activation of the system configuration mode. Following pressing and holding of the "open" and "close" buttons 56, 58 for the required time, the respective LED indicators 78, 79 next to those buttons will flash to indicate that the selected keypad controller is ready to begin addressing the system. Pressing the "open" button 56 at this point initiates automatic addressing by the microprocessor of the selected keypad controller, which assigns a unique identifying address to each component of the system.

While the system components are being addressed by the selected one of the keypad controllers 28, 62, 64, the "close" LED 79 will turn off and the "open" LED 78 will flash rapidly (e.g., 8 flashes per second) to indicate that the system components are being addressed. During this time, the "open" LEDs 78, 94 of the other keypad controllers 28, 62, 64 and CCIs 88, and the single LED 132 of the electronic drive units 120, will also flash rapidly. When each device has been addressed, the LEDs 78, 94, 132 will flash slowly (e.g., once per second) to indicate that addressing is complete and that the "system configuration mode" may be exited, such as by pressing and holding buttons 56, 58 of the selected keypad controller. The system could also be configured to provide for exiting of the system configuration mode from any keypad controller, drive unit, infrared transmitter or CCI of the system.

In addition to providing a visual indication of various programming stages, the lighting of the LEDs at keypad controllers, CCIs, and EDUs of the system also provides a confirmation of correct wiring. It should be understood that any CCI-connected device could be used, in a similar manner as described above for the keypad controllers, to enter the system address mode and to initiate component addressing. It should also be understood that the system could be configured to provide for system programming from the CCI itself without input to the CCI from an alternate device or control system connected to the CCI.

The "system configuration mode" may also be entered, and component addressing initiated, using infrared transmitter 70 as follows. The transmitter 70 is aimed at any keypad 64 or CCI 88 having an infrared receiver, or at any EDU 12, 102, 120 having an external IR receiver 82. In a similar manner to the above-described method of addressing from a keypad controller, the "system configuration mode" is entered by pressing and holding both the "open" and "close" buttons 72, 74 of the IR controller 70. Addressing is then initiated by pressing button 72.

Automatic addressing of the components of the shade control system may also be initiated via the control panel 122 of any one of the drive units 120 as follows. Pressing and holding the close limit button 126 of the control panel 122 for several seconds, for example, will place the control panel 122 in a "ready to address" mode. The single LED 132 will light steadily. Addressing of the system components by the microprocessor of the drive unit 120 is then initiated by pressing adjustment button 130. The single LED 132 will then flash quickly, indicating that system components are being addressed. During this time, the "open" LEDs 78, 94 of the other keypad controllers 28, 62, 64 and CCIs 88, and the single LED 132 of the electronic drive units 120, will also flash rapidly.

B. Setting EDU Limits

The shade control system of the present invention is also programmable to set an "open limit" position and a "close limit" position for each of the electronic drive units. These limits determine how far the associated shade fabric will travel when the electronic drive unit is directed to drive the shade fabric to the full open or full close positions. The shade limit positions may be set for an electronic drive unit 120 using its control panel 122 as follows. Pressing open limit button 124 of the control panel 122 actuates a "set open limit" for that EDU 120 causing the single LED 132 to shine steadily. The adjustment buttons 128, 130 of the control panel 122 are then used to move the associated shade fabric 26 to the desired full open position. With the shade fabric in the desired position, the user presses and holds the open limit button 124 for a required minimum time (e.g., five seconds). The LED 132 will flash during a brief period (e.g., two seconds) and then turn off to indicate that the current position for the EDU has been stored by the microprocessor as the open limit. In a similar fashion, the close limit button 126 of the control panel 122 provides for setting the desired close limit position using the adjustment buttons 128, 130 in a "set close limit mode" for the EDU. The single LED 132 signals setting status by flashing in the same manner as described above for the "set open limit mode".

The open and close limits can also be set using the keypad controllers 28, 62, 64 as follows. A "limit set mode" of system programming is entered by simultaneously pressing and holding the "open" and "raise" buttons 56, 60 of a selected one of the keypad controllers 28, 62, 64 for a minimum time (e.g., five seconds). The "close" LED 79 will flash rapidly (e.g., eight times per second) and the "open" LED 78 will flash slowly (e.g., once per second) to indicate entry to the "limit set mode". One of the electronic drive units assigned to the selected one of the keypad controllers 28, 62, 64 is then chosen for setting limits of the drive unit by pressing and releasing the "open" button 56. Each time button 56 is pressed and released, one of the EDUs assigned to the selected keypad controller will direct its motor to begin raising and lowering the associated shade fabric over a short distance (i.e., cycle the shade) to visually identify the EDU assigned to the keypad controller.

Pressing and releasing the "close" button 58 will select assigned EDUs in a reverse order compared to the order selected using the "open" button. When the shade fabric of a desired EDU is cycled, a user can adjust the shade fabric of that EDU to the desired limit positions using the raise and lower buttons 60, 61 of the keypad controller. Pressing and holding the "open" button 56 for several seconds sets the "open limit" position. The LEDs 78, 79 will then light continuously for two seconds to indicate that the open limit has been set. Similarly, pressing and holding the "close" button 58 for several seconds will set the "close limit" position for the EDU. A user may then select other EDUs for limit setting by pressing and releasing the open button 56. Pressing and releasing the close button 58 will select assigned drive units for limit setting in a reversed order compared to the order selected using the open button. The user then exits the "limit set mode" by simultaneously pressing and holding the "open" and "raise" buttons on the selected one of the keypad controllers 28, 62, 64 for several seconds.

IR transmitter 70 can be used to set open and close limits for the EDUs of the shade control system of the present invention by aiming the transmitter 70 toward a keypad controller 64, a CCI 88 that includes an infrared receiver or a drive unit including an external infrared receiver. The targeted keypad controller 64 or CCI 88 is placed in the "limit set mode" by simultaneously pressing and holding the "open" button 72 and "raise" button 76 of the IR transmitter 70 for several seconds. The IR transmitter 70 is then used in a similar manner as described above for the keypad controllers 28, 62, 64. The assigned EDUs for the targeted keypad controller 64 or CCI 88 are then selected in order by pressing and releasing the "open" or "close" buttons and limits are set by pressing and holding the "open" or "close" buttons for several seconds.

In the above discussion, the keypad controllers, CCI or infrared receivers of the system were described as being configured to provide for setting limits of only those drive units of the system that are assigned to it. Such a configuration is for convenience but is not a requirement of the present invention. The system could be configured to provide for limit setting of any drive unit of the system using any keypad controller, CCI or infrared receiver.

C. Assignment of EDUs

Assignment of electronic drive units 12, 102 and 120 of the shade control system of the present invention for control is accomplished in the following manner. Assignment determines which EDUs will be operated by each of the keypad controllers 28, 62, 64, CCI 88 or infrared receiver of the system. Assigning EDUs to a particular keypad controller or CCI will not affect assignments that are made with respect to other keypad controllers or CCIs of the shade control system. EDUs are assigned to a selected one of the keypad controllers 28, 62, 64 by the following steps. In a similar manner to the above-described component addressing, a user first enters the "system configuration mode" at a selected one of the keypad controllers 28, 62, 64 by simultaneously pressing and holding the "open" and "close" buttons 56, 58 for several seconds. The "open" and "close" LEDs 78, 79 will flash to indicate that the selected keypad is ready to be used for assignment of EDUs.

A drive unit "assignment mode" is entered from the "system configuration mode" by pressing the "close" button 58 of a selected keypad controller. The "open" LED 78 will turn off and the "close" LED 79 will flash slowly (e.g., once per second) to indicate that the selected controller is ready for assignment of EDUs. The shade fabric moves up to indicated unassigned or down to indicate assigned. The EDUs may be assigned (or un-assigned) individually with respect to the selected keypad controller according to the following two options. According to a first option, individual EDUs 120 may be assigned using the adjustment buttons 128, 130 of EDU control panel 122. The system preferably provides for toggling between assigned and unassigned in response to pressing of any button of the drive unit control panel 122.

According to the second option, individual EDUs can be assigned (or un-assigned) to the selected keypad controller using the keypad controller without accessing EDU control panels as follows. Pressing and releasing the "open" button 56 will cause one of the EDUs of the system to direct its motor to raise and lower the associated shade fabric over a short distance (i.e., "cycle" the shade fabric). Repeatedly pressing and releasing button 56 will select EDUs in order causing each EDU to cycle its shade fabric. Pressing and releasing the "close" button will select EDUs in a reverse order compared to the order selected using the "open" button. An EDU chosen in this manner may then be un-assigned or assigned to the selected one of the keypad controllers 28, 62, 64 by pressing the "raise" button 60 or "lower" button 61, respectively. When the assignment of EDUs to the selected one of the keypad controllers has been completed, a user exits the "system configuration mode" by pressing and holding the "open" button 56.

According to the above options, the EDUs are selected individually for assignment. It is conceivable that the system could be configured to provide for a group assignment of drive units. It is conceivable, for example, that the system could be configured to un-assign all of EDUs of the system when in the system configuration mode in response to a predetermined actuation of one or more of the actuators. Similarly, the system could be configured to assign all EDUs in response to a predetermined actuation of one or more of the actuators.

Assignment of EDUs to the keypad controllers 64 can also be accomplished by aiming an IR transmitter 70 towards the internal IR receiver of the keypad controller 64. In a similar manner to the above-described method using keypad control buttons, the open and close buttons 72, 74, and the raise/lower buttons 76, 77, of the transmitter 70 may be used to assign and un-assign EDUs to a targeted one of the keypad controllers 64. Similarly, an alternate device or control system connected to a contact closure interface (CCI) 88 having open, close, raise and lower enabled controls may be used to assign and un-assign EDUs to the CCI 88. Similarly, EDUs can be assigned to an EDU that has an IR receiver.

As described above, the motorized shade control system of the present invention utilizes a communication network in which each component of the system is connected to a common communication bus. The common bus facilitates configuration, or reconfiguration, of the system during various programming stages including system addressing, setting of EDU limit positions and assignment of EDUs to keypad controllers or CCIs. The construction of the communication network of the present invention provides for troubleshooting and reporting of operational errors that may occur. As described above, signals directing the control units 34 of the electronic drive units 12 to move the associated shade fabrics 26 will be transmitted to the EDUs from the keypad controllers 28, 62, 64 and CCIs 88 at various times during operation and configuration of the system 10. In the event that an EDU fails to move the associated shade in response to such a command, the control system 10 could be arranged to diagnose and report various failures or conditions that may be responsible. For example, the system could be arranged to check such a failing EDU for hardware conditions including motor stall, motor overheating, duty cycle and software problems including corrupted position data.

Because all of the system components are connected to a common communications bus, the system could be interrogated following an EDU failure to respond for any systemic conditions, such as excess number of devices or duplication of component addresses for example. Following diagnosis of an EDU failure to respond, the shade control system 10 of the present invention could provide for error reporting to the keypad controller or CCI from which the command signal originated. Error reporting at the originating device could be achieved by display using various combination of on/off or flash rate lighting conditions for the LEDs of the originating device. It is also conceivable that the keypad controllers or CCIs could be modified to include a display (e.g., an LCD) to report numbered codes at an originating device.

The control system of the present invention has been described herein for configuring and operating multiple roller shades having internal motors driving a roller tube. The present invention, however, is not so limited and could be used in other applications. For example, the system could be used to control shade rollers having external motors driving roller tubes. The present invention could also be applied to configure and operate other motor driven window treatments including roman shades and draperies, for example.

The system programming using the common-bus communication network of the present invention has been described with reference to keypad controllers having open limit, close limit and raise/lower adjustment actuators for controlling the operation of system drive units. The present invention is not limited to any particular arrangement of actuators, however. It is conceivable, for example, that the system could be configured to provide for the above described system programming using other types of controllers. System programming could be achieved from any controller in which shade fabric control signals, such as raising and lowering of the shade, can be distinguished by the system from programming signals.

III. System Modifications

The shade control system 10 of the present invention facilitates configuration of system components, in the manner described above for example for addressing, limit setting, and assignment. The communication network of system 10 also facilitates modification of an established network as described below, to facilitate replacement of a device or combination of multiple networks without requiring loss of programming for the established network.

A. Device Replacement

Figure 18:
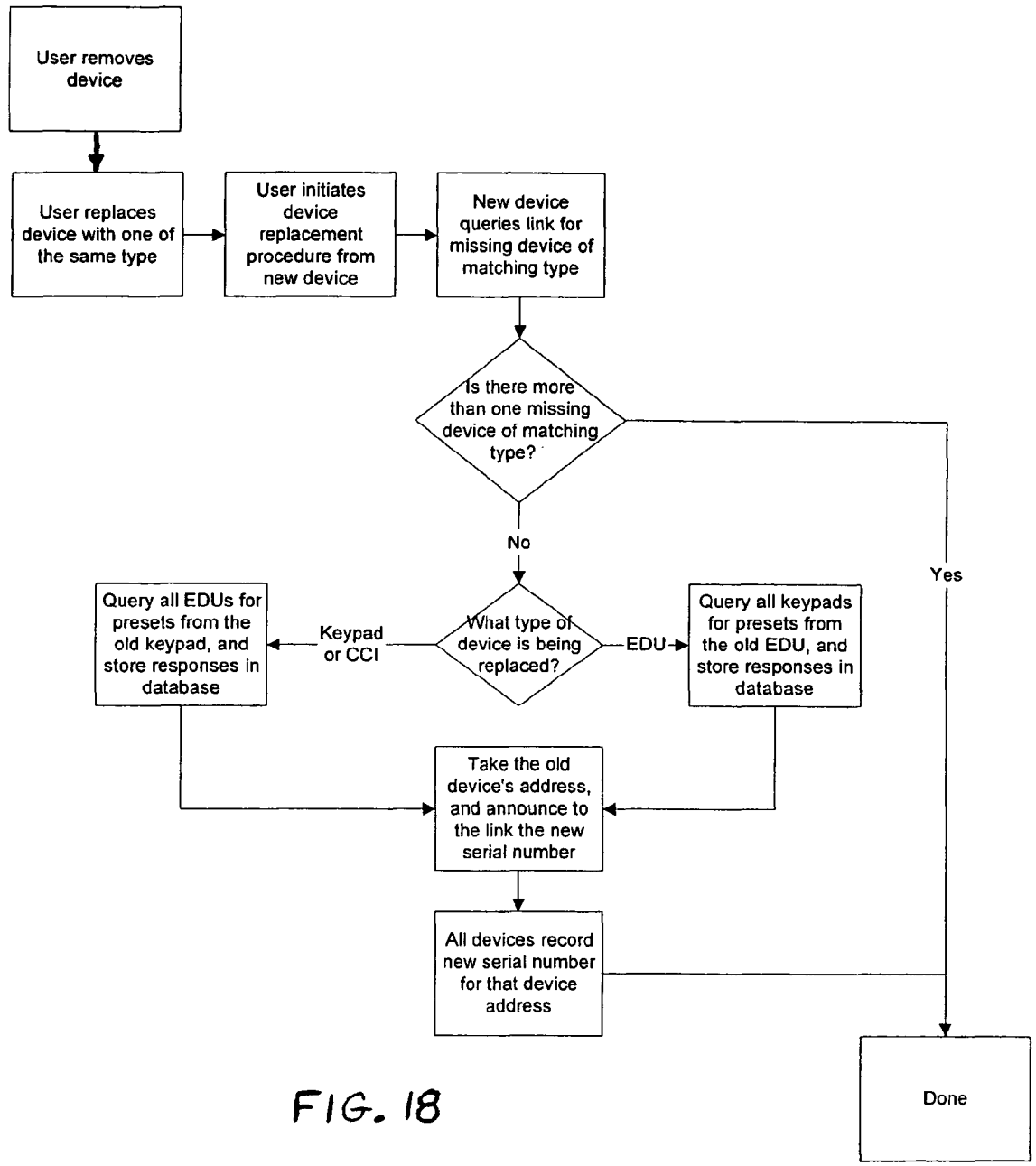
FIG. 18 is a schematic illustration of a procedure for replacement of a device in a shade control system according to the present invention.

Referring to FIG. 18, there is shown a procedure for replacement of a device in an established shade control system 10 of the present invention. Such replacement may be necessary following a failure of a device, for example. This replacement procedure occurs automatically upon initiation by a user following removal of a device from the system and replacement of a device of the similar type.

As described above, each of the EDUs and each of the keypads (or CCIs) preferably includes a programmable microprocessor. Each of the EDUs, therefore, is capable of maintaining a database of stored information that includes the preset shade position information for that EDU as well as the device address number and an associated unique serial number for each of the keypads (or CCIs) that are assigned to control that EDU. Similarly, each of the keypads (or CCIs) is capable of maintaining a database of stored information that includes the device address number and an associated unique serial number for each of the EDUs assigned to that keypad (or CCI) as well as the preset shade position information for each EDU assigned thereto. The resulting redundancy in the storage of the preset position information for the EDUs provides for reconstruction of the database of stored information on the replaced device without the need for access to the information stored on the replaced device that has been removed from the system. The system could also include a central processor, or some other device having data storage capability, for storing system information such as the above-described preset position information to provide a backup to the information stored at the keypads (or CCIs).

The database of stored information from a replaced device is reconstructed on a replacement device using the information redundantly stored by the devices that the replaced device controlled, or was controlled by, in the following manner. As shown in the flowchart of FIG. 18, a replacement EDU needing reconstruction of the database of stored information from the EDU it has replaced, will query all keypads and CCIs for presets that were associated with the replaced EDU. The replacement EDU will store all responses in its own database of stored information. In a similar manner, a replacement keypad (or CCI) will query all EDUs in the system for presets associated with the keypad (or CCI) that was removed from the system and stores all responses in it own database.

Once the database of stored information for the replacement device has been reconstructed from the query responses received from that devices that the removed device controlled, or was controlled by, the unique serial number for the replacement device will be announced. In response to the announcement of the serial number, each device in the system records the announced serial number at the device address number for that device.

B. Network Combinations

There may be occasions where it is desirable to link a first established shade control system with a second control system separately established from the first system. Such a situation could occur, for example, during construction or remodeling of a facility.

The separately established shade control systems would include separately addressed devices. Such a situation creates the possibility that a merger of the previously separate systems would result in multiple sets of devices sharing a common device address. To resolve the address conflict in prior art control systems, reprogramming of the conflicting devices, or of the entire system, was required. Reprogramming can be a time-consuming task, particularly where reprogramming of an entire system is required.

Figure 19:
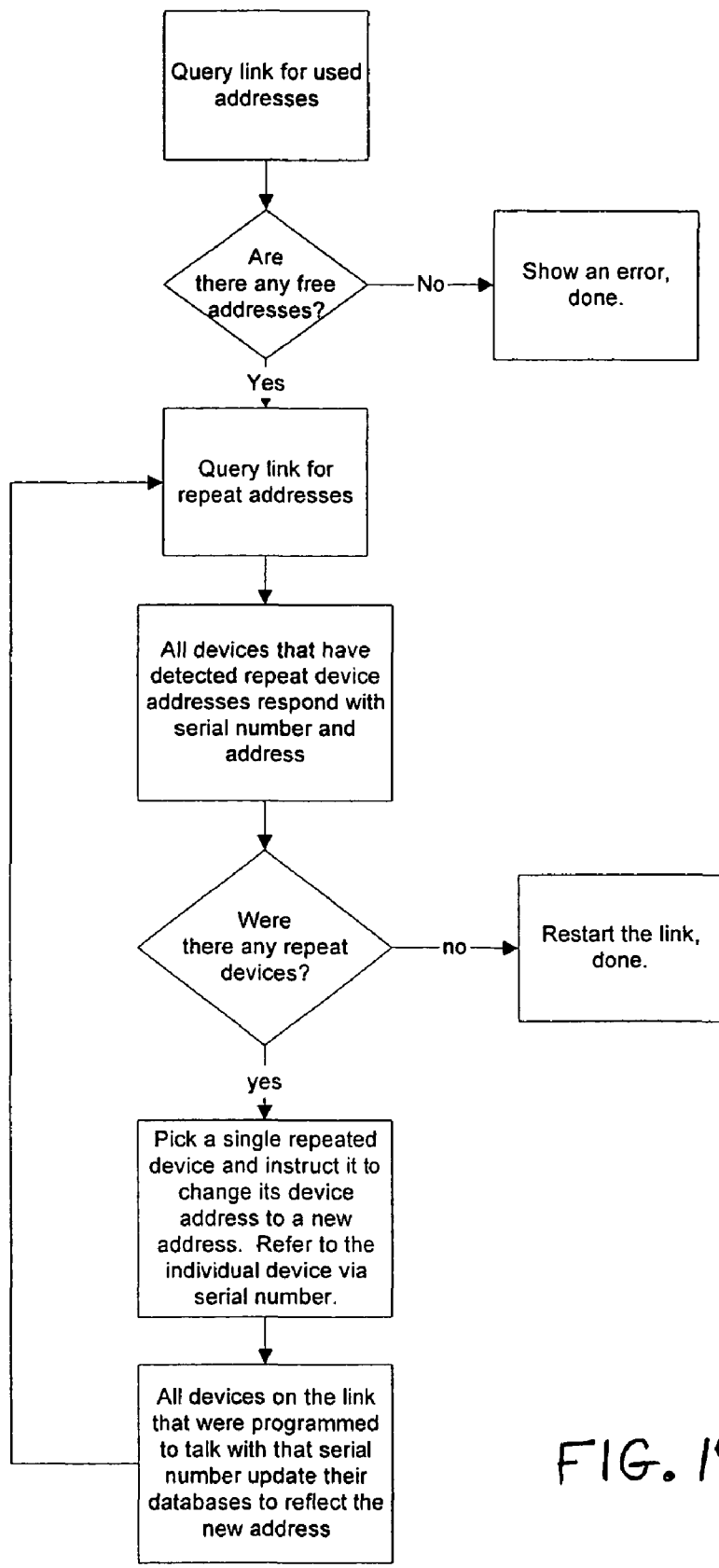
FIG. 19 is a schematic illustration of a procedure for resolving address conflicts during merger of separately established shade control systems according to the present invention.

Referring to FIG. 19, there is shown a flowchart for a procedure of resolving address conflict issues during merger of previously separate control systems. The procedure resolves address conflict issues using unused addresses while maintaining the system programming for each of the systems.

To provide for resolution of conflicting addresses, each device in a control system according to the present invention stores the serial number, which is a unique identifier, for each device that it is programmed to interact with. Following merger of formerly separate systems, each device is queried to identify repeated device addresses. If any repeated addresses are identified, one of the devices is selected for change in its device address to an available unused address. The newly assigned device address is reported to the system along with the serial number for the device. Any device that was programmed to interact with the newly addressed device updates its database to reflect the newly assigned address information.

IV. Hand-Held Programmer

Figure 20:
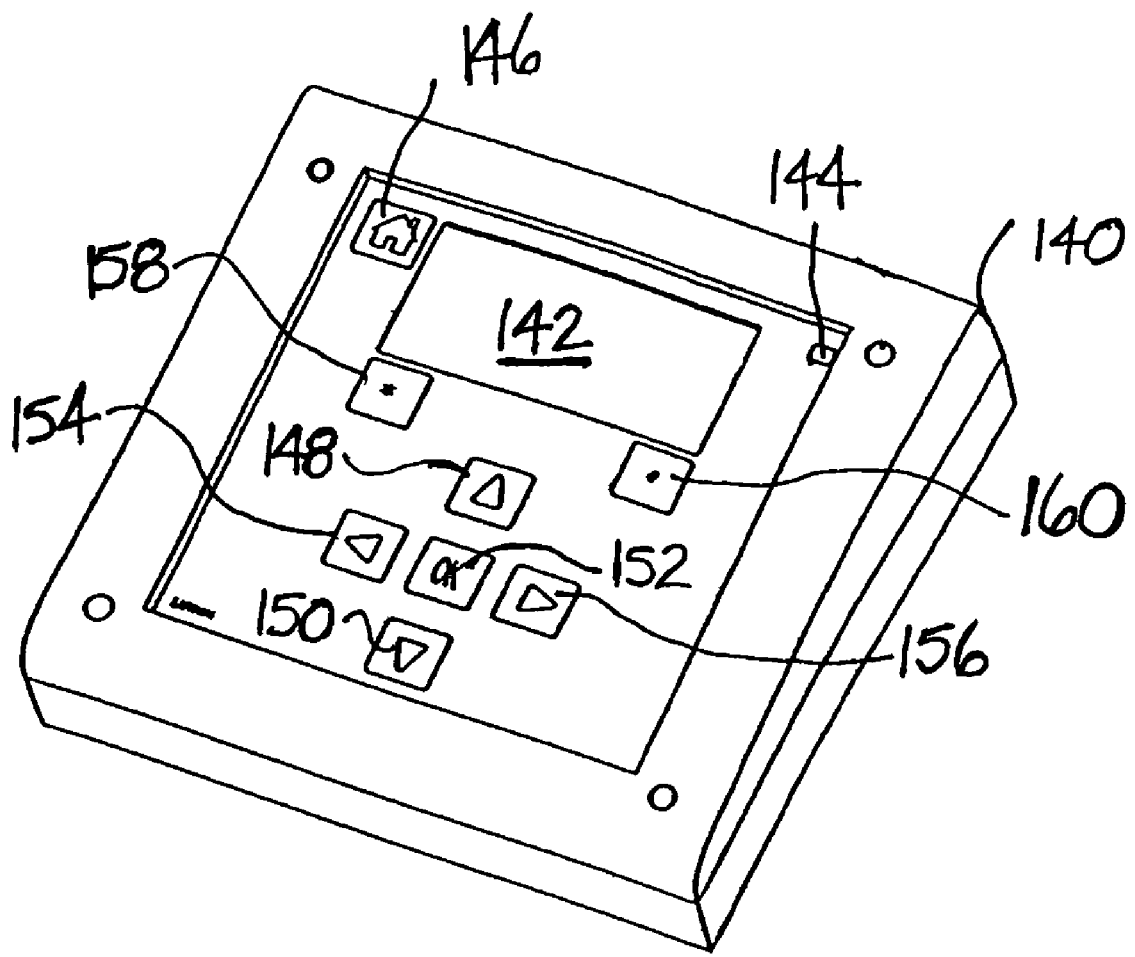
FIG. 20 is a perspective view of a hand-held programmer connectable to a shade control system of the present invention.

Referring to FIG. 20, there is shown a hand-held programmer ("HHP") 140 that is capable of performing system programming including the above-described functions of addressing, limit setting and assignment, for example. With respect to addressing, the HHP 140 provides for automatic addressing, in the above-described manner, as well as manual addressing. The manual addressing mode provides for addressing of selected devices in a selected order. The HHP 140 also provides for system wiring testing and other troubleshooting functions.

The HHP 140 may also be used during device replacement, described above, to program a replacement device with the database of stored information from a device that is to be removed from the system. Following connection of the HHP 140 to the system, the HHP 140 would select the device targeted for removal and retrieve the database of information stored by the microprocessor of the selected device. Following removal of the selected device and replacement with a device of the same type, the HHP 140 would program the information that was retrieved from the selected device into a database of stored information for the replacement device. This procedure differs from the above-described automatic procedure, which involved an indirect reconstruction of database information based on redundant information stored on device that a removed device controlled, or was controlled by. In contrast, the present manual procedure using the HHP 140 involves direct transfer of the information from the selected and removed device into the replacement device via the HHP.

The HHP 140 may be connected to the communication network of the shade control system 10 through any access point which may provided at a programming jack or on a power panel or keypad, for example. Although a wired connection is preferable, it is not a requirement. It is conceivable that a programming device could use IR, or some other wireless form of communication, to access and communicate with the control system 10.

The HHP 140 provides for a more user-friendly interface than is practical for the EDUs, keypads, or CCIs of the shade control system 10. The HHP 140 includes a liquid crystal display (LCD) 142 for displaying a variety of information to a user to facilitate the above described functions that can be performed by HHP. Such information includes menu option screens, numeric selection screens for modifying selected parameters, and screens for displaying basic information regarding the system. An LED 144 indicates when power is present in the LCD 142.

The HHP 140 includes a variety of user-actuated buttons. A home screen button 146 provides for return of the HHP 140 to a home state. The HHP 140 includes up and down buttons 148, 150, for scrolling though options presented to a user on the LCD 142, and an "OK" button 152 for activating a highlighted command or function. Left and right buttons 154, 156 provide for increasing or decreasing a numeric value presented by the LCD 142 on a numeric selection screen. This feature would be used, for example, to select a device from the system based on its address number. The HHP 140 also includes buttons 158, 160 located adjacent to opposite lower corners of the LCD 142. The buttons 158, 160 provide for selection of options displayed in the respective corners of the LCD 142 for selection of a previous screen or a next screen, for example.

In addition to system programming and diagnostics functions, the user-friendly screen displays of the HHP 140 could be used to facilitate adjustment of system devices. The EDUs used in shade roller systems, for example, are typically programmed with a default motor speed. The EDUs, however, may be reprogrammed to adjust the motor speed. The HHP 140 could be set up to facilitate such EDU reprogramming by providing "EDU options" including an "adjust speed" option. A user selecting the "adjust speed" option could then be prompted to choose between "select RPM" and "restore default RPM" options. Selection of the "select RPM" option would result in the display of a numeric selection screen. As described above, the left and right buttons 154, 156 of HHP 140 would then be actuated by a user to raise and lower the numeric value displayed on the screen to the desired RPM setting for a selected EDU.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A shade control system comprising:
   a plurality of drive units each having a motor adapted for moving an associated shade member;
   a plurality of drive unit controllers each capable of generating command signals for directing at least one of the drive units to move its associated shade member; and a single two-way communication bus capable of transmitting the command signals, each of the drive units and drive unit controllers connected to the single two-way communication bus without any intervening devices such that each drive unit controller is adapted to be assignable to communicate with any of the drive units, and each of the drive units is assignable to communicate with any of the drive unit controllers;

wherein during configuration of the system at least one of the drive unit controllers is operable to select one of the drive units to be assigned to the drive unit controller such that in response to being selected the selected drive unit automatically cycles its associated shade member by raising and lowering the shade member over a short distance to provide visual indication of the selected drive unit, and wherein the at least one drive unit controller is then operable to assign the selected drive unit to the drive unit controller.

2. The shade control system according to claim 1, wherein the shade members associated with the drive units are shade fabrics wound on a roller tube and wherein the motor of each drive unit operably engages the roller tube for rotation of the roller tube.

3. The shade control system according to claim 2, wherein the plurality of drive unit controllers includes at least one keypad controller having an open limit actuator and a close limit actuator for generating command signals for moving the associated shade fabric of at least one of the drive units to an open limit position and a close limit position, the at least one keypad controller further including a raise actuator and a lower actuator for generating command signals for moving the associated shade fabric of at least one of the drive units through raise and lower position adjustments.

4. The shade control system according to claim 3, wherein the at least one keypad controller includes an infrared transmissible window for receiving an infrared signal within an interior of the keypad controller from a remotely located infrared transmitter.

5. The shade control system according to claim 4, wherein the infrared transmitter includes an open limit actuator and a close limit actuator for generating command signals for moving the associated shade fabric of at least one of the drive units to an open limit position and a close limit position, the infrared transmitter further including a raise actuator and a lower actuator for generating command signals for moving the associated shade fabric of at least one of the drive units through raise and lower position adjustments.

6. The shade control system according to claim 3, wherein the at least one keypad controller further includes at least one preset actuator for generating a preset command signal for moving the associated shade fabric of at least one of the drive units to a preset position.

7. The shade control system according to claim 1, further comprising a microprocessor associated with at least one of the drive units and drive unit controllers, the microprocessor being programmed to automatically address each one of the drive units and drive unit controllers with a unique identifier.

8. The shade control system according to claim 1, wherein the plurality of drive unit controllers includes at least one keypad controller having a plurality of actuators for generating the command signals for moving the associated shade fabric, the at least one keypad controller is operable to enter a drive unit assignment mode in response to an actuation of two or more of the plurality of actuators, to subsequently select drive units in response to an actuation of one of the plurality of actuators, and to assign a selected one of the drive units to the keypad controller in response to an actuation of one of the plurality of actuators.

9. A shade control system comprising:
a plurality of drive units each having a motor adapted for moving an associated shade fabric wound on a roller tube, the motor of each drive unit operably engaging the roller tube for rotation of the roller tube to move the shade fabric between an open limit position and a close limit position;

a plurality of drive unit controllers each capable of generating command signals for directing at least one of the drive units to move its associated shade fabric; the plurality of drive unit controllers including at least one keypad controller having a plurality of actuators for generating command signals for moving the associated shade fabric; and a communication bus capable of transmitting the command signals, each of the drive units and drive unit controllers connected to the communication bus in a common arrangement such that each one of the drive units and drive unit controllers can communicate with every other drive unit and drive unit controller connected to the communication bus;

wherein during configuration of the system the at least one keypad controller is operable to:

enter a limit setting program mode in response to an actuation of two or more of the plurality of actuators;

subsequently select a drive unit to be assigned to one of the drive unit controllers in response to an actuation of at least one of the plurality of actuators such that in response to being selected the selected drive unit automatically cycles its associated shade fabric by raising and lowering the shade fabric over a short distance to provide visual indication of the selected drive unit;

set the open limit position for the selected drive unit in response to a press and hold of at least one of the plurality of actuators; and set the close limit position for the selected drive unit in response to a press and hold of at least one of the plurality of actuators.

10. The shade control system according to claim 9, wherein the plurality of actuators of the at least one keypad controller comprises an open limit actuator and a close limit actuator for generating command signals for moving the associated shade fabric of at least one of the drive units to the open limit position and the close limit position, and a raise actuator and a lower actuator for generating command signals for moving the associated shade fabric of at least one of the drive units through raise and lower position adjustments.

11. The shade control system according to claim 10, wherein the at least one keypad controller is operable to select drive units in response to an actuation of either one of the open limit actuator and the close limit actuator.

12. The shade control system according to claim 11, wherein the at least one keypad controller is operable to direct the selected one of the drive units to move its associated shade fabric in response to an actuation of either one of the raise actuator and the lower actuator, and to set the open limit position and the close limit position for the selected one of the drive units in response to a subsequent press and hold of the open limit actuator and the close limit actuator, respectively.

13. The shade control system according to claim 12, wherein the at least one keypad controller is operable to enter the limit setting program mode in response to an actuation of a predetermined combination of the open limit actuator, the close limit actuator, the raise actuator, and the lower actuator.

14. The shade control system according to claim 13, wherein each of the plurality of the keypad controllers is further operable to exit the limit setting program mode in response to an actuation of the predetermined combination of the open limit actuator, the close limit actuator, the raise actuator, and the lower actuator.

15. A shade control system comprising:
   a plurality of drive units each having a motor adapted for moving an associated shade fabric wound on a roller tube, the motor of each drive unit operably engaging the roller tube for rotation of the roller tube;
   a plurality of drive unit controllers each capable of generating command signals for directing at least one of the drive units to move its associated shade fabric; the plurality of drive unit controllers including at least one keypad controller having a plurality of actuators for generating the command signals for moving the associated shade fabric; and
   a communication bus capable of transmitting the command signals, each of the drive units and drive unit controllers connected to the communication bus in a common arrangement such that each one of the drive units and drive unit controllers can communicate with every other drive unit and drive unit controller connected to the communication bus;
   wherein during configuration of the system the at least one keypad controller is operable to:
   enter a drive unit assignment mode in response to an actuation of two or more of the plurality of actuators;
   subsequently select drive units to be assigned to one of the drive unit controllers in response to an actuation of one of the plurality of actuators such that in response to being selected a selected drive unit automatically cycles its associated shade fabric by raising and lowering the shade fabric over a short distance to provide visual indication of the selected drive unit; and
   then assign the selected drive unit to the at least one keypad controller in response to an actuation of one of the plurality of actuators.

16. The shade control system according to claim 15, wherein the plurality of actuators of the at least one keypad controller comprises an open limit actuator and a close limit actuator for generating command signals for moving the associated shade fabric of at least one of the drive units to the open limit position and the close limit position, and a raise actuator and a lower actuator for generating command signals for moving the associated shade fabric of at least one of the drive units through raise and lower position adjustments.

17. The shade control system according to claim 16, wherein the at least one keypad controller is operable to select drive units in response to an actuation of either one of the open limit actuator and the close limit actuator.

18. The shade control system according to claim 17, wherein the at least one keypad controller is operable to assign the selected drive unit to the keypad controller in response to an actuation of the lower actuator, and to unassign the selected drive unit to the keypad controller in response to an actuation of the raise actuator.

19. The shade control system according to claim 18, wherein the at least one keypad controller is operable to enter the drive unit assignment mode in response to an actuation of a predetermined combination of the open limit actuator, the close limit actuator, the raise actuator, and the lower actuator.

20. The shade control system according to claim 19, wherein the at least one keypad controller is further operable to exit the drive unit assignment mode in response to an actuation of the predetermined combination of the open limit actuator, the close limit actuator, the raise actuator, and the lower actuator.

21. The shade control system according to claim 15, wherein the at least one keypad controller is operable to select different drive units in response to consecutive actuations of one of the plurality of actuators.

22. The shade control system according to claim 15, wherein the selected drive unit lowers the associated shade fabric to the closed limit position after the at least one keypad controller assigns the selected drive unit to the at least one keypad controller.

23. The shade control system according to claim 15, wherein the at least one keypad controller is further operable to unassign the selected one of the drive units from the at least one keypad controller in response to an actuation of one of the plurality of actuators.

24. The shade control system according to claim 23, wherein the selected drive unit raises the associated shade fabric to the open limit position after the at least one keypad controller unassigns the selected drive unit from the at least one keypad controller.

25. A method of controlling a motorized shade system comprising the steps of:
   providing a plurality of drive units each having a motor adapted for moving an associated shade member;
   providing a plurality of drive unit controllers each capable of generating command signals for directing at least one of the drive units to move its associated shade member;
   connecting each of the drive units and drive unit controllers to a single two-way communication bus without any intervening devices such that each drive unit controller is adapted to be assignable to communicate with any of the drive units, and each drive unit is assignable to communicate with any of the drive unit controllers;
   during configuration of the system, using one of the drive unit controllers to select one of the drive units to be assigned to the drive unit controller;
   automatically cycling the associated shade member of the selected drive unit by raising and lowering the shade member over a short distance to provide visual identification of the selected drive unit in response to the drive unit being selected; and
   then using one of the drive unit controllers to assign the selected drive unit to the drive unit controller.

26. The method according to claim 25, wherein the shade members associated with the drive units are shade fabrics wound on a roller tube and wherein the motor of each drive unit operably engages the roller tube for rotation of the roller tube.

27. The method according to claim 26, wherein the step of providing a plurality of drive unit controllers comprises providing at least one keypad controller having an open limit actuator and a close limit actuator for generating command signals for moving the associated shade fabric of at least one of the drive units to an open limit position and a close limit position, and a raise actuator and a lower actuator for generating command signals for moving the associated shade fabric of at least one of the drive units through raise and lower position adjustments.

28. The method according to claim 27, further comprising the steps of:
   providing an infrared transmissible window on the at least one keypad controller; and
   receiving an infrared signal at the at least one keypad controller from a remotely located infrared transmitter.

29. The method according to claim 28, wherein the infrared transmitter includes an open limit actuator and a close limit actuator for generating command signals for moving the associated shade fabric of at least one of the drive units to an open limit position and a close limit position, and a raise actuator and a lower actuator for generating command signals for moving the associated shade fabric of at least one of the drive units through raise and lower position adjustments.

30. The method according to claim 27, further comprising the steps of:
providing a preset actuator on the at least one keypad controller; and
moving the shade fabric of at least one of the drive units to a preset position in response to an actuation of the preset actuator.

31. The method according to claim 25, further comprising the step of:
automatically addressing each one of the drive units and drive unit controllers with a unique identifier.

32. The method according to claim 25, wherein the plurality of drive unit controllers include at least one keypad controller having a plurality of actuators for generating the command signals for moving the associated shade fabric, and the step of using the one of the drive unit controllers further comprises the steps of:
selecting one of the drive units in response to an actuation of one of the plurality of actuators of the at least one keypad controller; and
assigning the selected drive unit to the at least one keypad controller in response to an actuation of one of the plurality of actuators of the at least one keypad controller.

33. A method of controlling a motorized shade system comprising the steps of:
providing a plurality of drive units each having a motor adapted for moving an associated shade fabric windingly received by a roller tube rotated by the motor between an open limit position and a close limit position;
providing a plurality of drive unit controllers each capable of generating command signals for directing at least one of the drive units to move its associated shade fabric, the plurality of drive unit controllers including at least one keypad controller having a plurality of actuators for generating the command signals for moving the associated shade fabric;
connecting each of the drive units and drive unit controllers to a communication bus in a common arrangement in which each of the drive units and drive unit controllers can communicate with every other drive unit and drive unit controller connected to the communication bus;
during configuration of the system, entering a limit setting program mode in response to an actuation of two or more of the plurality of actuators of the at least one keypad controller;
subsequently selecting drive units to be assigned to one of the drive unit controllers in response to an actuation of one of the plurality of actuators of the at least one keypad controller such that in response to being selected a selected drive unit automatically cycles its associated shade fabric by raising and lowering the shade fabric over a short distance to provide visual indication of the selected drive unit;
setting the open limit position for the selected drive unit in response to a press and hold of at least one of the plurality of actuators of the at least one keypad controller; and
setting the close limit position for the selected drive unit in response to a press and hold of at least one of the plurality of actuators of the at least one keypad controller.

34. The method according to claim 33, wherein the plurality of actuators of the at least one keypad controller comprises an open limit actuator and a close limit actuator for generating command signals for moving the associated shade fabric of at least one of the drive units to the open limit position and the close limit position, and a raise actuator and a lower actuator for generating command signals for moving the associated shade fabric of at least one of the drive units through raise and lower position adjustments.

35. The method according to claim 34, wherein the step of selecting comprises selecting drive units in response to an actuation of either one of the open limit actuator and the close limit actuator of the at least one keypad controller.

36. The method according to claim 35,
wherein the step of setting the open limit and the step of setting the close limit comprise setting the open limit position and the close limit position for the selected one of the drive units in response to a subsequent press and hold of the open limit actuator and the close limit actuator, respectively.

37. The method according to claim 36, wherein the step of entering the limit setting program mode comprises entering the limit setting program mode in response to an actuation of a predetermined combination of the open limit actuator, the close limit actuator, the raise actuator, and the lower actuator of the at least one keypad controller.

38. The method according to claim 37, further comprising the step of:
exiting the limit setting program mode in response to an actuation of the predetermined combination of the open limit actuator, the close limit actuator, the raise actuator, and the lower actuator of the at least one keypad controller.

39. A method of controlling a motorized shade system comprising the steps of:
providing a plurality of drive units each having a motor adapted for moving an associated shade fabric windingly received by a roller tube rotated by the motor;
providing a plurality of drive unit controllers each capable of generating command signals for directing at least one of the drive units to move its associated shade fabric, the plurality of drive unit controllers including at least one keypad controller having a plurality of actuators for generating the command signals for moving the associated shade fabric;
connecting each of the drive units and drive unit controllers to a communication bus in a common arrangement in which each of the drive units and drive unit controllers can communicate with every other drive unit and drive unit controller connected to the communication bus;
during configuration of the system, entering a drive unit assignment mode in response to an actuation of two or more of the plurality of actuators of the at least one keypad controller;
subsequently selecting drive units to be assigned to one of the drive unit controllers in response to an actuation of one of the plurality of actuators of the at least one keypad controller such that in response to being selected a selected drive unit automatically cycles its associated shade fabric by raising and lowering the shade fabric over a short distance to provide visual indication of the selected drive unit; and then assigning the selected drive unit to the at least one keypad controller in response to an actuation of one of the plurality of actuators of the at least one keypad controller.

40. The method according to claim 39, further comprising the step of:
unassigning the selected drive unit from the keypad controller in response to an actuation of one of plurality of actuators of the at least one keypad controller.

41. The method according to claim 40, further comprising the step of: raising the associated shade fabric of the selected drive unit to the open limit position after the step of unassigning.

42. The method according to claim 40, wherein the plurality of actuators of the at least one keypad controller comprises an open limit actuator and a close limit actuator for generating command signals for moving the associated shade fabric of at least one of the drive units to the open limit position and the close limit position, and a raise actuator and a lower actuator for generating command signals for moving the associated shade fabric of at least one of the drive units through raise and lower position adjustments.

43. The method according to claim 42, wherein the step of selecting comprises selecting drive units in response to an actuation of either one of the open limit actuator and the close limit actuator.

44. The method according to claim 43, wherein the step of assigning comprises assigning the selected drive unit to the keypad controller in response to an actuation of the lower actuator, and the step of unassigning comprises unassigning the selected drive unit from the keypad controller in response to an actuation of the raise actuator.

45. The method according to claim 44, wherein the step of entering the drive unit assignment mode comprises entering the drive unit assignment mode in response to an actuation of a predetermined combination of the open limit actuator, the close limit actuator, the raise actuator, and the lower actuator of the at least one keypad controller.

46. The method according to claim 45, further comprising the step of:
exiting the drive unit assignment mode in response to an actuation of the predetermined combination of the open limit actuator, the close limit actuator, the raise actuator, and the lower actuator of the at least one keypad controller.

47. The method according to claim 39, further comprising the step of: lowering the associated shade fabric of the selected drive unit to the closed limit position after the step of assigning.

48. The method according to claim 39, wherein the step of selecting further comprises selecting different drive units in response to consecutive actuations of one of the plurality of actuators.

49. A method of controlling a motorized shade system comprising the steps of:
providing first and second drive units each having a motor adapted for moving an associated shade fabric windingly received by a roller tube rotated by the motor, each drive unit including a control panel having actuators for raise and lower adjustment of the position of the associated shade fabric and for setting open and close limit positions;
providing first and second drive unit controllers each capable of generating command signals for directing at least one of the drive units to move its associated shade member, wherein the first drive unit controller comprises first and second actuators;
connecting each of the drive units and drive unit controllers to a communication bus in a common arrangement in which each of the drive units and drive unit controllers can communicate with every other of the drive units and drive unit controllers connected to the communication bus;
during configuration of the system, actuating the first actuator of the first drive unit controller;
causing the first drive unit to automatically cycle its associated shade fabric by raising and lowering the shade fabric over a short distance in response to the actuation of the first actuator of the first drive unit controller to provide visual indication of the first drive unit being selected for assignment;
then actuating the second actuator of the first drive unit controller to assign the first drive unit to the first drive unit controller;
subsequently actuating the first actuator of the first drive unit controller;
causing the second drive unit to automatically cycle its associated shade fabric by raising and lowering its shade fabric over a short distance in response to the actuation of the first actuator of the first drive unit controller to provide visual indication of the second drive unit being selected for assignment; and
the actuating the second actuator of the second drive unit to assign the second drive unit to the first drive unit controller.

* * * * *